(12) United States Patent
Seol et al.

(10) Patent No.: US 12,600,337 B2
(45) Date of Patent: Apr. 14, 2026

(54) HYDRAULIC BRAKE APPARATUS FOR VEHICLE AND CONTROL METHOD THEREFOR

(71) Applicant: HYUNDAI MOBIS CO., LTD., Seoul (KR)

(72) Inventors: Yong Cheol Seol, Hwaseong-si (KR); Jee Sang Lee, Seongnam-si (KR); Jae Won Seo, Seoul (KR); Jin Ho Seong, Hwaseong-si (KR); Hwan Gon Kim, Hanam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 843 days.

(21) Appl. No.: 17/901,993

(22) Filed: Sep. 2, 2022

(65) Prior Publication Data

US 2023/0134290 A1     May 4, 2023

(30) Foreign Application Priority Data

Oct. 29, 2021     (KR) ........................ 10-2021-0147210

(51) Int. Cl.
  B60T 13/74 (2006.01)
  B60T 8/92 (2006.01)
  B60T 13/68 (2006.01)
(52) U.S. Cl.
  CPC ............. B60T 13/686 (2013.01); B60T 8/92 (2013.01); *B60T 2270/403* (2013.01); *B60T 2270/406* (2013.01)
(58) Field of Classification Search
  CPC ................. B60T 13/745; B60T 13/686; B60T 2270/402; B60T 2270/404; B60T 2270/406; B60T 8/885; B60T 8/92
  See application file for complete search history.

(56) References Cited

U.S. PATENT DOCUMENTS

| | | | | |
|---|---|---|---|---|
| 4,538,228 A | * | 8/1985 | Brearey ................ | B60T 8/5081 303/174 |
| 6,193,328 B1 | * | 2/2001 | Feigel ........................ | B60T 8/42 303/113.5 |
| 2004/0025941 A1 | * | 2/2004 | Wuerth ................. | B60T 17/221 137/487.5 |

(Continued)

FOREIGN PATENT DOCUMENTS

| | | |
|---|---|---|
| CN | 1452734 A | 10/2003 |
| CN | 111565986 A | 8/2020 |

OTHER PUBLICATIONS

Chinese Office Action issued Dec. 17, 2025 in corresponding Chinese Patent Application No. 202211202968.3.

*Primary Examiner* — Bradley T King

(74) *Attorney, Agent, or Firm* — NovoTechIP International PLLC

(57)     ABSTRACT

A method for controlling a hydraulic brake apparatus for a vehicle is disclosed. The method includes: a target valve group closing process in which a control unit controls a brake device to close a target brake group selectively including the plurality of valves; a hydraulic pressure supply process in which the control unit controls the brake device to supply hydraulic pressure to at least one of channels separated by closing the target valve group; and a contaminant removal process in which the control unit controls the brake device such that the target valve group opens and the fluid washes the target valve group.

16 Claims, 15 Drawing Sheets

<u>2000</u>

(56) References Cited

U.S. PATENT DOCUMENTS

| | | | |
|---|---|---|---|
| 2006/0163511 A1* | 7/2006 | Trautmann | B60T 8/363 |
| | | | 251/129.15 |
| 2007/0132310 A1* | 6/2007 | Yamamoto | B60T 8/4081 |
| | | | 303/DIG. 11 |
| 2011/0175437 A1* | 7/2011 | Yamamoto | B60T 8/4081 |
| | | | 303/14 |
| 2015/0014082 A1* | 1/2015 | Kasper | B60T 7/12 |
| | | | 180/282 |
| 2015/0274143 A1* | 10/2015 | Miyazaki | B60T 8/348 |
| | | | 303/9.61 |
| 2021/0070273 A1* | 3/2021 | Timm | B60T 17/221 |

* cited by examiner

*2000*

_1000_

HYDRAULIC BRAKE APPARATUS FOR VEHICLE AND CONTROL METHOD THEREFOR

CROSS-REFERENCE TO RELATED APPLICATIONS

The present application claims the benefit of priority to Korean Patent Application No. 10-2021-0147210, filed on Oct. 29, 2021, the disclosure of which is incorporated herein by this reference in its entirety.

TECHNICAL FIELD

The present disclosure relates to a hydraulic brake apparatus for a vehicle and a method of controlling the same.

BACKGROUND

Description of this section only provides the background information of the present disclosure without configuring the related art.

A hydraulic brake apparatus for a vehicle is configured to brake a vehicle by transmitting hydraulic pressure, which is generated by a pump therein, to a plurality of wheel brakes mounted on different wheels. In order to prevent a wheel-lock phenomenon, a hydraulic brake apparatus for a vehicle has to be able to adjust the magnitude of hydraulic pressure that is transmitted to wheel brakes. Further, in order to perform an Electronic Stability Control (ESC) function, a hydraulic brake apparatus for a vehicle has to be able to independently transmit hydraulic pressure generated by a pump to a plurality of wheel brakes. That is, a hydraulic brake apparatus for a vehicle has to be able to adjust the path for transmitting hydraulic pressure. Such functions are for the safety of passengers in a vehicle and should be able to be necessarily performed by an automotive brake system.

A plurality of valves is mounted in the channels of a hydraulic brake apparatus to adjust the magnitude of hydraulic pressure that is transmitted to wheel brakes or to change the flow paths of fluid. A hydraulic brake apparatus adjusts the opening/closing states of a plurality of valves, that is, whether to open/close the valves, or the degrees of opening. When the functions described above are not appropriately performed due to contaminants stuck in even any one of a plurality of valves, etc., the safety of a vehicle is considerably deteriorated. For example, when braking pressure is supplied to only one wheel brake, the vehicle may be unexpectedly turned.

SUMMARY

The present disclosure relates to a hydraulic brake apparatus for a vehicle that can remove contaminants in a valve by controlling valves and a pump in the hydraulic brake apparatus even without an additional device, and a method of controlling the hydraulic brake apparatus.

However, the objects of the present disclosure are not limited to the objects described above and other objects will be clearly understood by those skilled in the art from the following description.

According to one aspect, the present disclosure provides a method for controlling a hydraulic brake apparatus for a vehicle that includes a brake device including a plurality of valves for selectively transmitting hydraulic pressure to a plurality of wheel brakes and a pressurizer for pressurizing fluid, and a control unit controlling the brake device. The method comprises: a target valve group closing process in which the control unit controls the brake device to close a target brake group selectively including the plurality of valves; a hydraulic pressure supply process in which the control unit controls the brake device to supply hydraulic pressure to at least one of channels separated by closing the target valve group; and a contaminant removal process in which the control unit controls the brake device such that the target valve group opens and the fluid washes the target valve group.

According to another aspect, the present disclosure provides a hydraulic brake apparatus for a vehicle that comprises a brake device including a plurality of valves for selectively transmitting hydraulic pressure to a plurality of wheel brakes and a pressurizer for pressurizing fluid using torque of a motor, and a control unit controlling the brake device. Herein, the control unit comprises: a receiving unit configured to receive a brake pedal stroke measured by a pedal stroke sensor, information sensed by a door sensor about whether a door is opened or close, and information for determining whether the engine of a vehicle is stopped; a pressurizer controller configured to control the brake device to supply hydraulic pressure to at least one of channels separated by closing a target valve group selectively includ-ing the plurality of valves, with the target valve group closed; and a valve controller configured to control the target valve group such that the target valve group closes to wash the target valve group, and control the target valve group such that the target valve group opens after hydraulic pressure is supplied to the at least one of the channels separated by closing the target valve group.

A hydraulic brake apparatus for a vehicle and a method of controlling the hydraulic brake apparatus according to an embodiment have an effect that it is possible to remove contaminants in a valve even without an additional device by controlling valves and a pump in the hydraulic brake apparatus.

DETAILED DESCRIPTION

Figure 1:
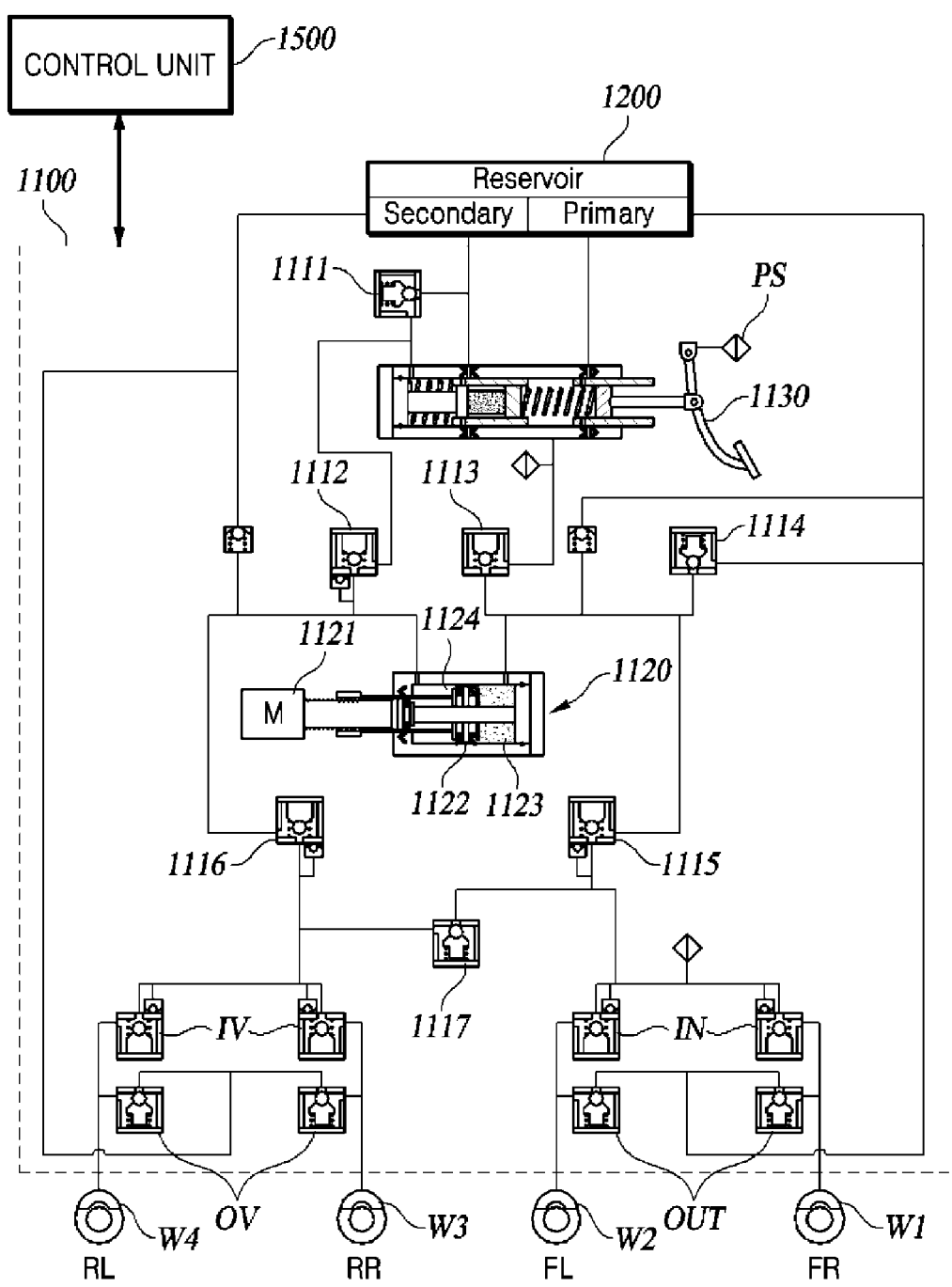
FIG. 1 is a hydraulic circuit diagram showing a hydraulic brake apparatus for a vehicle employing a control method according to an embodiment of the present disclosure.

Hereinafter, some exemplary embodiments of the present disclosure will be described in detail with reference to the accompanying drawings. In the following description, like reference numerals preferably designate like elements, although the elements are shown in different drawings. Furthermore, in the following description of various exemplary embodiments of the present disclosure, a detailed description of known functions and configurations incorporated therein will be omitted for clarity and for brevity.

Additionally, various terms such as first, second, A, B, (i), (ii), (a), (b), etc., are used solely to differentiate one component from the other but not to imply or suggest the substances, order, or sequence of the components. Throughout the present specification, when a part 'includes' or 'comprises' a component, the part is meant to further include other components, not to exclude thereof unless specifically stated to the contrary. The terms such as 'unit,' 'module,' and the like refer to one or more units for processing at least one function or operation, which may be implemented by hardware, software, or a combination thereof.

FIG. 1 is a block diagram showing a hydraulic brake apparatus for a vehicle of a control method according to an embodiment of the present disclosure.

Referring to FIG. 1, a hydraulic brake apparatus of a control method according to an embodiment of the present disclosure includes some or all of a plurality of wheel brakes w1, w2, w3, and w4, a brake device 1100, and a control unit 150 controlling the brake device 1100.

The plurality of wheel brakes w1, w2, w3, and w4 are configured to restrain rotation of wheels using hydraulic pressure generated by the brake device 1100. The plurality of wheel brakes w1, w2, w3, and w4 are mounted on different wheels and can apply a braking force to the corresponding wheels. The wheel brakes w1, w2, w3, and w4 may be caliper type brakes or drum type brakes. In the present disclosure, the wheel brakes mounted on front wheels are referred to as front wheel brakes w1 and w2 and the wheel brakes mounted on rear wheels are referred to as rear wheel brakes w3 and w4.

The brake device 1100 supplies hydraulic pressure, which is needed to brake a vehicle, to the wheel brakes w1, w2, w3, and w4. The brake device 1100 includes a pressurizer for pressurizing fluid, and a plurality of valves 1111 to 1117, IV, IN, OV, and OUT for selectively transmitting fluid to the plurality of wheel brakes w1, w2, w3, and w4.

The pressurizer 120 includes some or all of a motor 1121, a piston 1122, and a hydraulic chamber 1123, 1124. The pressurizer 120 may be driven by the motor 1121. The pressurizer 1120 may include a power train (not shown) that converts torque of the motor 1121 into a force for translating the piston 1122. The power train, which is a mechanism converting a rotation motion into a translation motion, for example, may use a ball screw and a screw nut. The piston 1122 may be configured to move forward or backward, depending on the rotation direction of the motor 1121. In the present disclosure, the side opposite to the motor 1121 is referred to as a 'front side,' and the side of the motor 1121 is referred to as a 'rear side'. The hydraulic chamber 1123, 1124, which is a space in which fluid is pressurized, may be divided into two parts by the piston 1122. The hydraulic chamber positioned ahead of the piston 1122 is referred to as first hydraulic chamber 1123, and the hydraulic chamber positioned behind the piston 1122 is referred to as a second hydraulic chamber 1124. When the piston 1122 moves forward, the fluid in the first hydraulic chamber 1123 is pressurized, and the fluid can be supplied into the second hydraulic chamber 1124. When the piston 1122 moves backward, the fluid in the second hydraulic chamber 1124 is pressurized, and the fluid can be supplied into the first hydraulic chamber 1123. However, the pressurizer of the present disclosure is not limited to such a double-acting pressurizer 1120. The pressurizer 1120, for example, may be a single-acting pressurizer 1120 configured such that fluid is not pressurized in the second hydraulic chamber 1124, and fluid is supplied to the first hydraulic chamber 1123. The pressurizer 1120 may include a cylinder of which the inner circumferential surface is in contact with the outer circumferential surface of the piston 1122. The piston 1122 may slide and move toward the front or the rear of the cylinder, depending on the rotation direction of the motor 1121.

The plurality of valves 1111 to 1117, IV, IN, OV, and OUT may include a plurality of solenoid valve configured to the opening/closing states that are changed in accordance with an applied current value. For example, the plurality of valves 1111 to 1117, IV, IN, OV, and OUT may include inlet valves IV and IN and outlet valves OV and OUT that are mounted on the wheel brakes w1, w2, w3, and w4 to implement an ABS function. The inlet valves and the outlet valves that are mounted on the front wheel brakes w1 and w2 are referred to as front wheel inlet valves IN and front wheel outlet valves OUT, respectively, and the inlet valves and the outlet valves that are mounted on the rear wheel brakes w3 and w4 are referred to as rear wheel inlet valves IV and rear wheel outlet valves OV, respectively.

The front wheel inlet valves IN and the front wheel outlet valves OUT may be mounted in the channel connecting the front wheel brakes w1 and w2 and the first hydraulic chamber 1123. The control unit 1500 can adjust hydraulic pressure that is transmitted to the front wheel brakes w1 and w2 from the first hydraulic chamber 1123 by controlling the opening/closing states of the front wheel inlet valves IN and the front wheel outlet valves OUT. Similarly, the rear wheel inlet valves IV and the rear wheel outlet valves OV may be mounted in the channel connecting the rear wheel brakes w3 and w4 and the second hydraulic chamber 1124. The control unit 1500 can adjust hydraulic pressure that is transmitted to the rear wheel brakes w3 and w4 from the second hydraulic chamber 1124 by controlling the opening/closing states of the rear wheel inlet valves IV and the rear wheel outlet valves OV. A first block valve 1115 may be disposed in the channel connecting the first hydraulic chamber 1123 and the front wheel inlet valves IN and a second block valve 1116 may be disposed in the channel connecting the second hydraulic chamber 1124 and the rear wheel inlet valves IV. The first block valve 1115 may include a check valve that allows fluid to flow from the first chamber to the wheel brakes w1, w2, w3, and w4 and prevents fluid from flowing from the wheel brakes w1, w2, w3, and w4 to the first chamber. The second block valve 1116 may include a check valve that allows fluid to flow from the second chamber to the wheel brakes w1, w2, w3, and w4 and prevents fluid from flowing from the wheel brakes w1, w2, w3, and w4 to the second chamber.

The plurality of valves 1111 to 1117, IV, IN, OV, and OUT may include a connection valve that fluid-communicates or disconnects at least some of the plurality of valves 1111 to 1117, IV, IN, OV, and OUT and some other plurality of valves 1111 to 1117, IV, IN, OV, and OUT to or from each other. The connection valve 1117 according to an embodiment of the present disclosure is configured to fluid-communicate or disconnect the channel connecting the first hydraulic chamber 1123 and the front wheel brakes w1 and w2 and the channel connecting the second hydraulic chamber 1124 and the rear wheel brakes w3 and w4 to or from each other. When the connection valve 1117 is opened, the channel connecting the first hydraulic chamber 1123 and the front wheel brakes w1 and w2 and the channel connecting the second hydraulic chamber 1124 and the rear wheel brakes w3 and w4 fluid-communicate with each other.

The plurality of valves 1111 to 1117, IV, IN, OV, and OUT may include a third valve 1113 and a fourth valve 1114 that are mounted in the channel connecting the first chamber and an oil reservoir 1200, and a first valve 1111 and a second valve 1112 that are mounted in the channel connecting the second chamber and the oil reservoir 1200.

The control unit 1500 controls the brake device 1100. The control unit 1500 can control rotation of the motor 1121 by adjusting the phase of the intensity of a current that is supplied to the motor 1121. The control unit 1500 can control the opening/closing states of solenoid valves 1111 to 1117, IV, IN, OV, and OUT by adjusting a current value that is applied to the solenoid valves 1111 to 1117, IV, IN, OV, and OUT.

Figure 2:
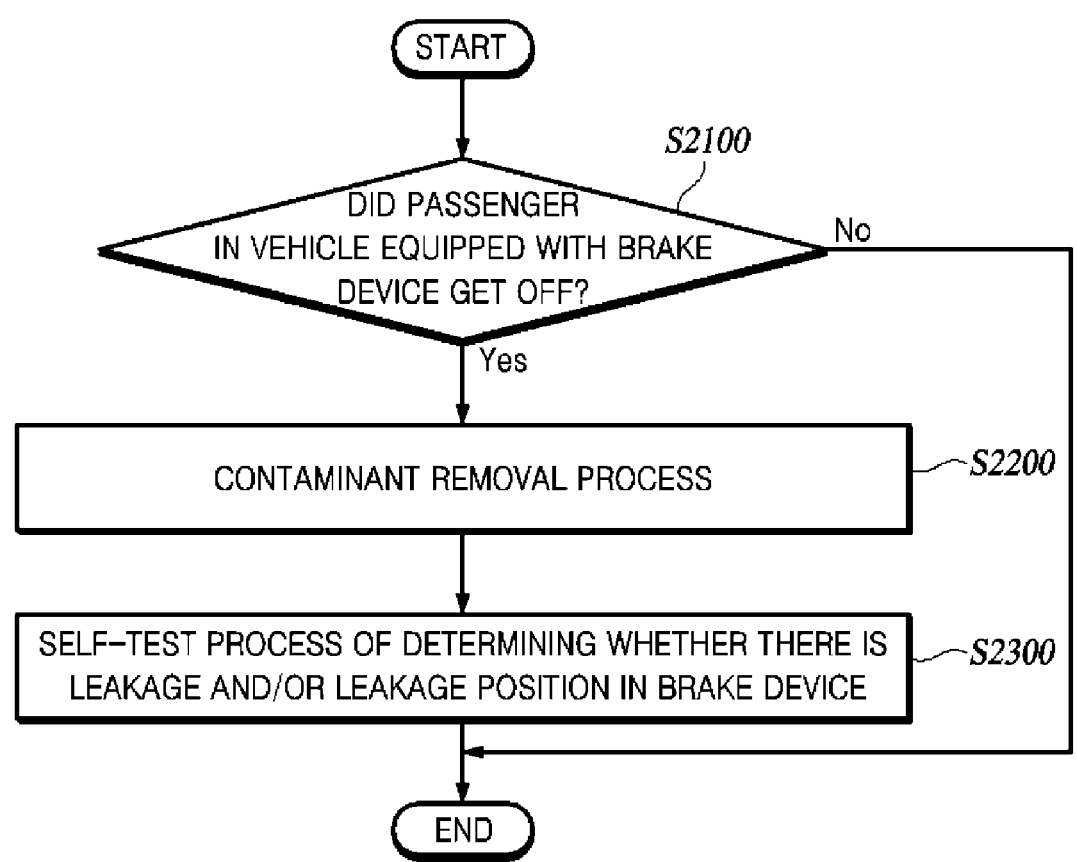
FIG. 2 is a flowchart showing a control method according to an embodiment of the present disclosure.

FIG. 2 is a flowchart showing a control method according to an embodiment of the present disclosure.

In the present disclosure, the fact that the control unit 1500 controls displacement of the piston 1122, for example, may mean that the control unit 1500 moves the piston 1122 by adjusting a current that is applied to the motor 1121 of the pressurizer 1120. Further, displacement of the piston 1122 may be measured by a rotation angle sensor (not shown) of the motor 1121 or a piston displacement sensor (not shown) in the pressurizer 1120.

Referring to FIGS. 1 and 2, in the control method according to an embodiment of the present disclosure, the control unit 1500 controls the brake device 100 to remove contaminants at a target valve group including one or more values selected from the plurality of valves 1111 to 1117, IV, IN, OV, and OUT (S2200). The contaminants may be understood as substances that are included in the valves 1111 to 1117, IV, IN, OV, and OUT, unlike the design specifications, and interfere with the intended driving of the brake device 1100. In the process S2200, the control unit 1500 controls the opening/closing states of displacement of the piston 1122 and the valves 1111 to 1117, IV, IN, OV, and OUT to remove contaminants as a target valve group. In this process, the brake device 1100 may generate braking pressure and driving noise while being driven. When the process S2200 is performed with a passenger in a vehicle, the passenger may feel that the vehicle is driven differently from intention due to braking pressure and driving noise generated in the process S2200. Accordingly, whether a passenger has gotten off the vehicle may be determined before the process S2200 (S2100). When it is determined that a passenger has gotten off the vehicle in the step S2100, the process S2200 is performed, and when it is determined that a passenger has not gotten off the vehicle, the control is ended. The control unit 1500 can determine whether there is leakage (i.e., a leakage occurrence) and/or a leakage position at the brake device 1100 with contaminants removed from the valves 1111 to 1117, IV, IN, OV, and OUT using the process S2200 (S2300).

Figure 3:
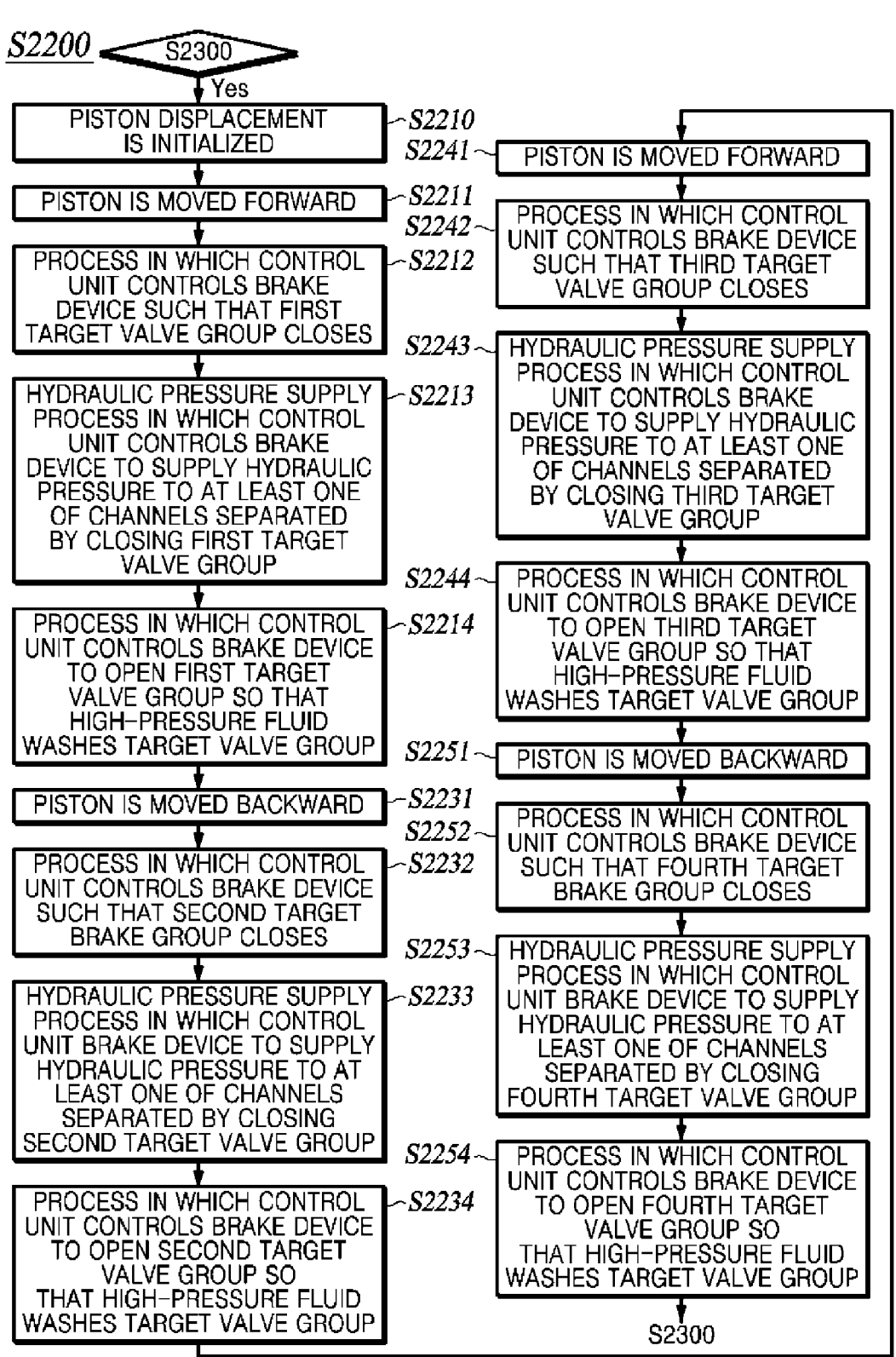
FIG. 3 is a flowchart showing a process of removing contaminants according to an embodiment of the present disclosure.

FIG. 3 is a flowchart showing a process of removing contaminants according to an embodiment of the present disclosure.

Referring to FIGS. 1 and 3, in the contaminant removal process S2200, the control unit 1500 controls the brake device 100 such that a target valve group selectively including the plurality of valves 1111 to 1117, IV, IN, OV, and OUT is closed. Thereafter, as the target valve group is closed, the control unit 1500 controls the brake device 1100 to supply hydraulic pressure to at least one of separate channels. For example, the control unit 1500 may control the motor 1121 such that the piston 1122 moves forward or backward. Accordingly, by the valves 1111 to 1117, IV, IN, OV, and OUT (hereafter, 'target valves') included in the target valve group, high hydraulic pressure is generated in the channel at a side of the target valves that is separate from the channel at another side of the target valves. Accordingly, a pressure difference is generated between the channel at a side and the channel at another side with the target valves therebetween. Thereafter, the control unit 1500 controls the brake device 1100 such that the target valve group is opened. When the target valve groups are opened, high-pressure fluid is transmitted from the channel at a side of the target valves to the channel at another side through the target valves. The contaminants in the target valves are removed while the high-pressure fluid passes through the target valves. According to the control method of an embodiment of the present disclosure, it is possible to remove contaminants in the brake device 1100 using the existing brake device 1100 and control unit 1500 without a new additional component.

The contaminant removal process may be performed on a plurality of target valve groups including a different combination of the valves 1111 to 1117, IV, IN, OV, and OUT. In this case, the fact that the contaminant removal process is performed on any target valve group means that a process of removing contaminants at the target valve group by closing the target valve group, supplying hydraulic pressure to a channel, and opening the target valve group. For example, the contaminant removal process may be performed on a target valve group including some of the valves 1111 to 1117, IV, IN, OV, and OUT mounted on the brake device 1100, and then the contaminant removal process may be performed on a target valve group including the other valves 1111 to 1117, IV, IN, OV, and OUT mounted on the brake device 1100. Accordingly, it is possible to remove contaminants at all of the valves 1111 to 1117, IV, IN, OV, and OUT mounted on the brake device 1100.

The contaminant removal process according to an embodiment of the present disclosure is performed on each of first to fourth target valve groups 1111, 1112, 1116, 1117, and OV. The first target valve group 1113, 1114, OV, and OUT includes at least one of the valves 1111 to 1117, IV, IN, OV, and OUT mounted in the channel connecting the first hydraulic chamber 1123 and the oil reservoir 1200. The first target valve group 1113, 1114, OV, and OUT may include the third valve 1113, the fourth valve 1114, the rear wheel outlet valve OV, and the front wheel outlet valve OUT. The second target valve group 1111, 1112, OV, and OUT includes at least one of the valves 1111 to 1124, IV, IN, OV, and OUT mounted in the channel connecting the second hydraulic chamber 1124 and the oil reservoir 1200. The second target valve group 1111, 1112, OV, and OUT may include the first valve 1111, the second valve 1112, the rear wheel outlet valve OV, and the front wheel outlet valve OUT. The third target valve group 1113, 1114, 1115, 1117, and OUT includes at least one of the valves 1111 to 1117, IV, IN, OV, and OUT mounted in the channel connecting the first hydraulic chamber 1123 and the wheel brakes w1, w2, w3, and w4. The third target valve group 1113, 1114, 1115, 1117, and OUT may include the third valve 1113, the fourth valve 1114, the first block valve 1115, the connection valve 1117, and the front wheel outlet valve OUT. The fourth target valve group 1111, 1112, 1116, 1117, and OV includes at least one of the valves 1111 to 1124, IV, IN, OV, and OUT mounted in the channel connecting the second hydraulic chamber 1124 and the wheel brakes w1, w2, w3, and w4. The fourth target valve group 1111, 1112, 1116, 1117, and OV may include the first valve 1111, the second valve 1112, the second block valve 1116, the connection valve 1117, and the rear wheel outlet valve OV. The contaminant removal process for the first target valve group 1113, 1114, OV, and OUT, the contaminant removal process for the second target valve group 1111, 1112, OV, and OUT, the contaminant removal process for the third target valve group 1113, and the contaminant removal process for the fourth target valve group 1114 are sequentially performed, so all of the fifteen valves 1111 to 1117, IV, IN, OV, and OUT shown in FIG. 1 can be washed.

In the process of supplying hydraulic pressure, the channel to which the hydraulic pressure is supplied may be changed in accordance with the movement direction of the piston 1122. For example, when the piston 1122 moves forward, hydraulic pressure may be supplied to the channel connected to the first chamber, and when the piston 1122 moves backward, hydraulic pressure may be supplied to the channel connected to the second chamber. Accordingly, the control method can configure a combination of valves 1111 to 1117, IV, IN, OV, and OUT included in a target valve group in correspondence to the movement direction of the piston 1122. The control unit 1500 can wash a plurality of target valve groups by controlling the movement direction of the piston 1122 and the opening/closing states of the valves 1111 to 1117, IV, IN, OV, and OUT after controlling the pressurizer 1120 (S2210) such that the displacement of the piston 1122 is initialized. The initialized position of the piston 1122 may be a position when the piston 1122 maximally moved toward the monitor 1121.

Figure 4:
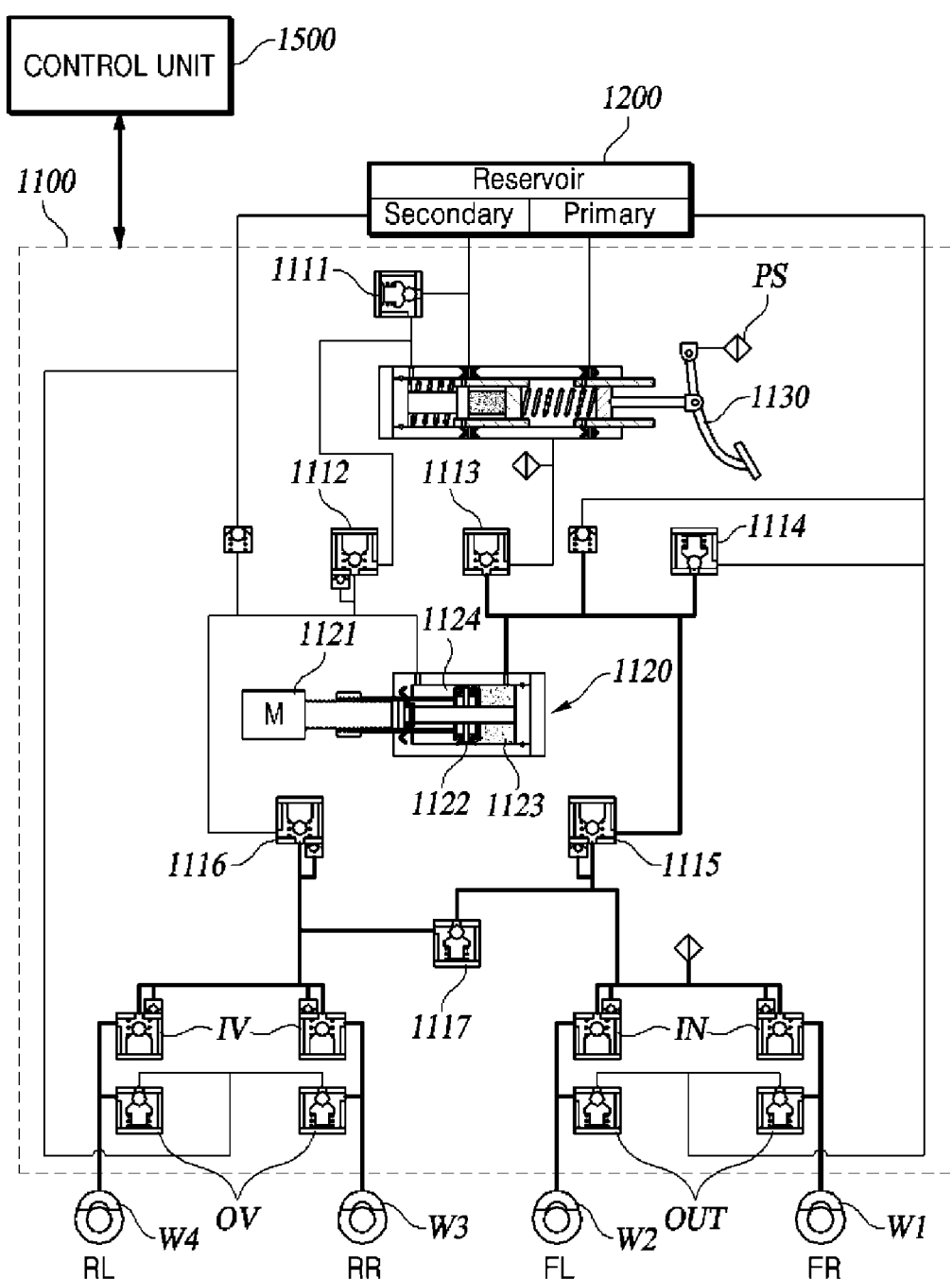
FIG. 4 is a hydraulic circuit diagram showing the state in which a first target valve group according to an embodiment of the present disclosure is closed in a process of removing contaminants from the first target valve group.

FIG. 4 is a hydraulic circuit diagram showing the state in which a first target valve group according to an embodiment of the present disclosure is closed in a process of removing contaminants from the first target valve group.

Figure 5:
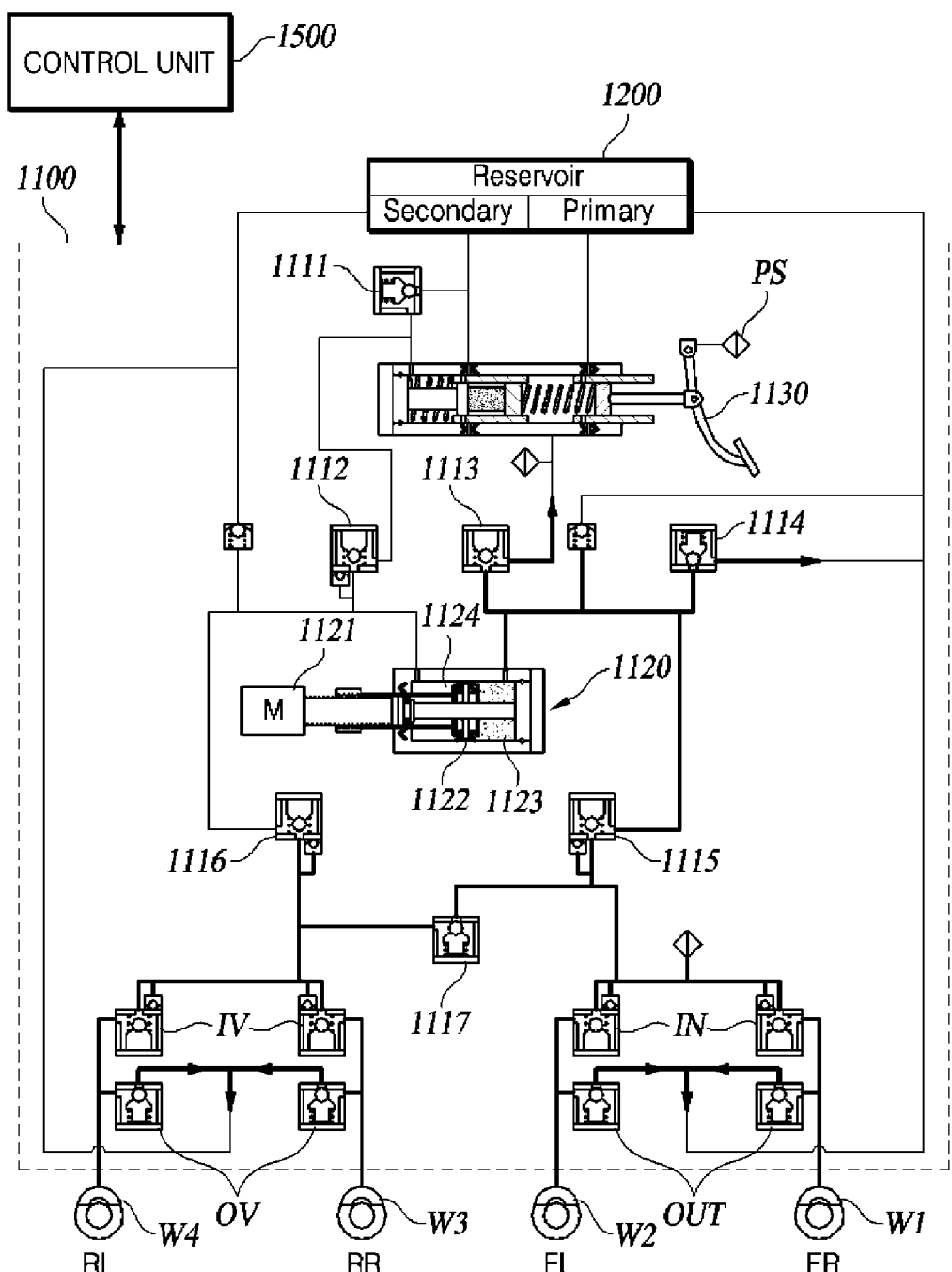
FIG. 5 is a hydraulic circuit diagram showing the state in which the first target valve group according to an embodiment of the present disclosure is open in the process of removing contaminants from the first target valve group.

FIG. 5 is a hydraulic circuit diagram showing the state in which the first target valve group according to an embodiment of the present disclosure is open in the process of removing contaminants from the first target valve group.

Referring to FIGS. 2 to 4, a contaminant removal process is performed on the first target valve group 1113, 1114, OV, and OUT. The control unit 1500 controls the brake device 1100 such that the first target valve group 1113, 1114, OV, and OUT is closed. Thereafter, the control unit 1500 controls the brake device 1100 such that the piston 1122 moves forward. The control unit 1500 can disconnect the outlet valves OV and OUT and the oil reservoir 1200 at a lower pressure by closing the second block valve 1116. Accordingly, the hydraulic pressure of the channels indicated by bold lines in FIG. 4 increases. That is, high hydraulic pressure is generated at a first side of each of the first target valves 1113, 1114, OV, and OUT.

Referring to FIGS. 2 to 5, the control unit 1500 controls the brake device 1100 such that the first target valve group 1113, 1114, OV, and OUT is opened with high hydraulic pressure generated at the first side of each of the first target valves 1113, 1114, OV, and OUT. High-pressure fluid is transmitted to the channel at the first side of each of the first target valves 1113, 1114, OV, and OUT to the channel at a second side through the first target valves 1113, 1114, OV, and OUT. Accordingly, contaminants in the first target valve group 1113, 1114, OV, and OUT are separated out from the first target valve group 1113, 1114, OV, and OUT by the high-pressure fluid. Contaminants in each of the first target valves 1113, 1114, OV, and OUT can be collected to the oil reservoir 1120 through the channel at the second side of each of the first target valves 1113, 1114, OV, and OUT.

Such a contaminant removal process for the first target valve group 1113, 1114, OV, and OUT may include the process S2221 to S2224 of FIG. 2. In the contaminant removal process for the first target valve group 1113, 1114, OV, and OUT, the control unit 1500 controls the pressurizer 1120 such that the piston 1122 moves forward (S2221). The control unit 1500 controls the brake device 1100 such that the first target valve group 1113, 1114, OV, and OUT is closed (S2222). As the first target valve group 1113, 1114, OV, and OUT is closed after the process S2222, the control unit 1500 controls the brake device 1100 to supply hydraulic pressure to at least one of separate channels (S2223). After the process S2223, the control unit 1500 controls the brake device 1100 such that the first target valve group 1113, 1114, OV, and OUT is opened. Accordingly, the first target valve group 1113, 1114, OV, and OUT is washed (S2224).

Figure 6:
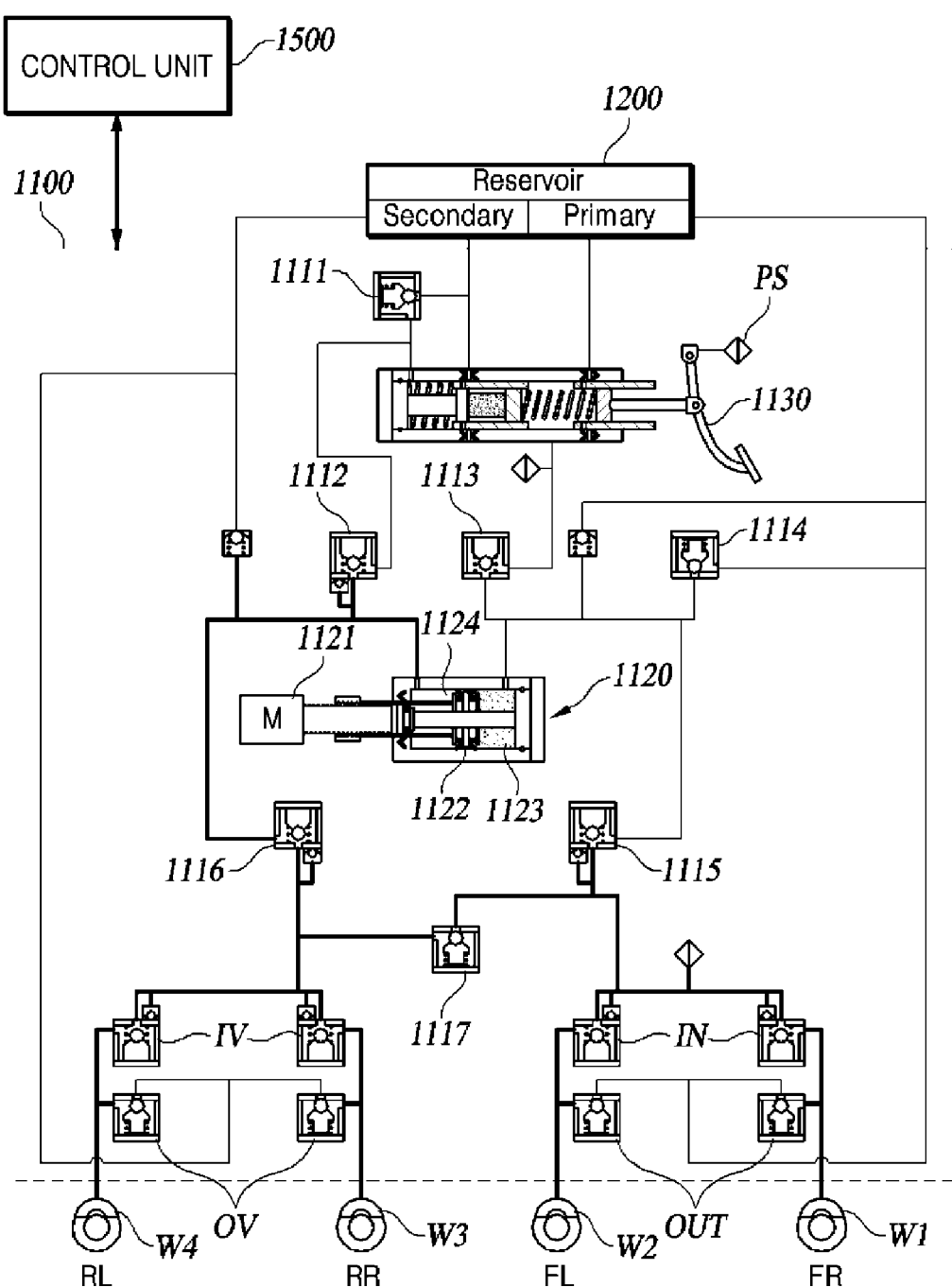
FIG. 6 is a hydraulic circuit diagram showing the state in which a second target valve group according to an embodiment of the present disclosure is closed in a process of removing contaminants from the second target valve group.

FIG. 6 is a hydraulic circuit diagram showing the state in which a second target valve group according to an embodiment of the present disclosure is closed in a process of removing contaminants from the second target valve group.

Figure 7:
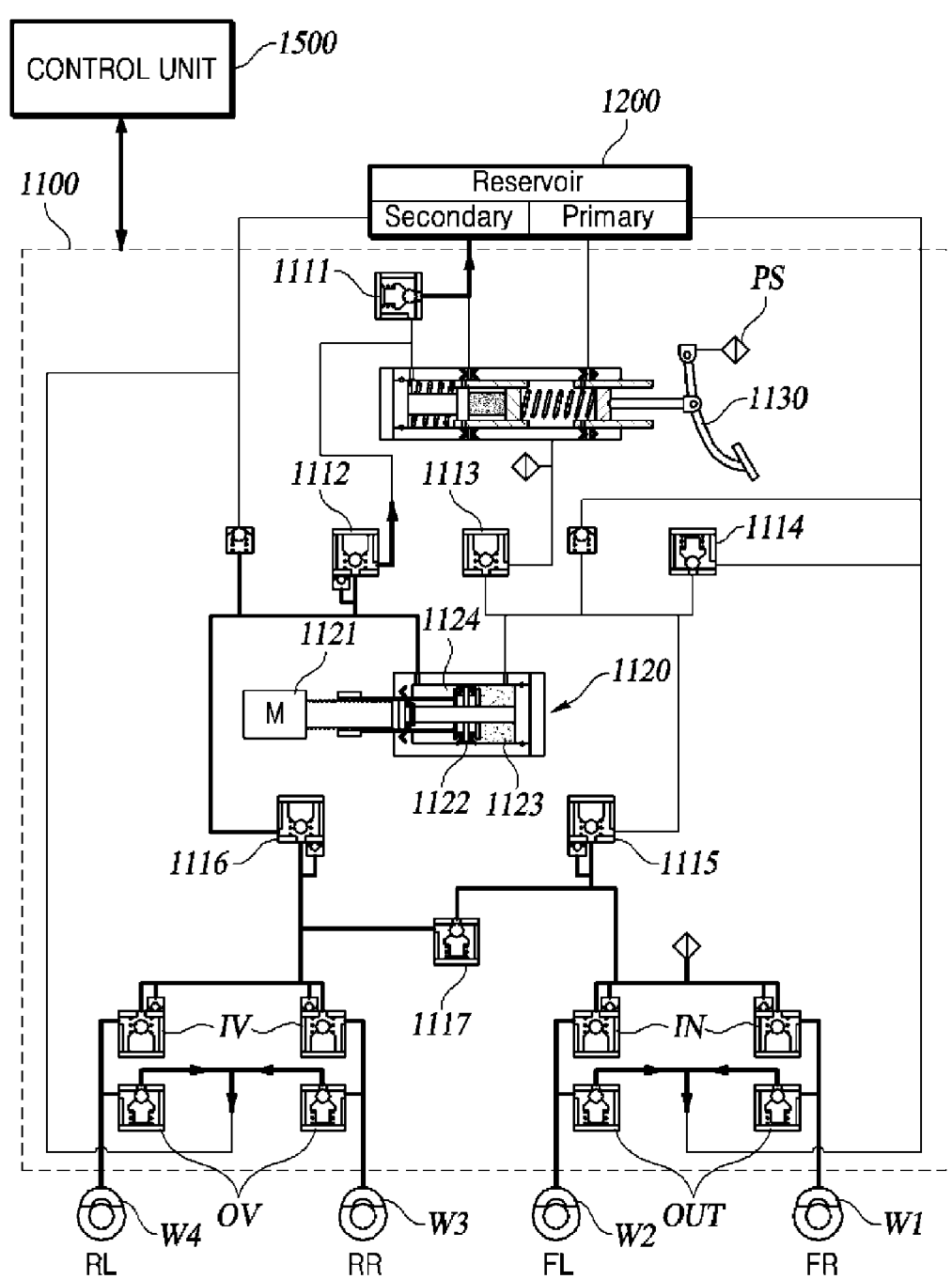
FIG. 7 is a hydraulic circuit diagram showing the state in which the second target valve group according to an embodiment of the present disclosure is open in the process of removing contaminants from the second target valve group.

FIG. 7 is a hydraulic circuit diagram showing the state in which the second target valve group according to an embodiment of the present disclosure is open in the process of removing contaminants from the second target valve group.

Referring to FIGS. 2 to 6, a contaminant removal process is performed on the second target valve group 1111, 1112, OV, and OUT. The control unit 1500 controls the brake device 1100 such that the second target valve group 1111, 1112, OV, and OUT is closed. Thereafter, the control unit 1500 controls the brake device 1100 such that the piston 1122 moves backward. The control unit 1500 can disconnect the outlet valves OV and OUT and the oil reservoir 1200 at lower pressure by closing the first block valve 1115. Accordingly, the hydraulic pressure of the channels indicated by bold lines in FIG. 6 increases. That is, high hydraulic pressure is generated at a first side of each of the second target valves 1111, 1112, OV, and OUT.

Referring to FIGS. 2 to 7, the control unit 1500 controls the brake device 1100 such that the second target valve group 1111, 1112, OV, and OUT is opened with high hydraulic pressure generated at the first side of each of the second target valves 1111, 1112, OV, and OUT. High-pressure fluid is transmitted to the channel at the first side of each of the second target valves 1111, 1112, OV, and OUT to the channel at a second side through the second target valves 1111, 1112, OV, and OUT. Accordingly, contaminants in the second target valve group 1111, 1112, OV, and OUT are separated out from the second target valve group 1111, 1112, OV, and OUT by the high-pressure fluid. Contaminants in each of the second target valves 1111, 1112, OV, and OUT can be collected to the oil reservoir 1112 through the channel at the second side of each of the second target valves 1111, 1112, OV, and OUT.

Such a contaminant removal process for the second target valve group 1111, 1112, OV, and OUT may include the process S2231 to S2234 of FIG. 2. In the contaminant removal process for the second target valve group 1111, 1112, OV, and OUT, the control unit 1500 controls the pressurizer 1120 such that the piston 1122 moves backward (S2231). The control unit 1500 controls the brake device 1100 such that the second target valve group 1111, 1112, OV, and OUT is closed (S2232). As the second target valve group 1111, 1112, OV, and OUT is closed after the process S2232, the control unit 1500 controls the brake device 1100 to supply hydraulic pressure to at least one of separate channels (S2233). After the process S2233, the control unit 1500 controls the brake device 1100 such that the second target valve group 1111, 1112, OV, and OUT is opened. Accordingly, second target valve group 1111, 1112, OV, and OUT is washed (S2234).

Figure 8:
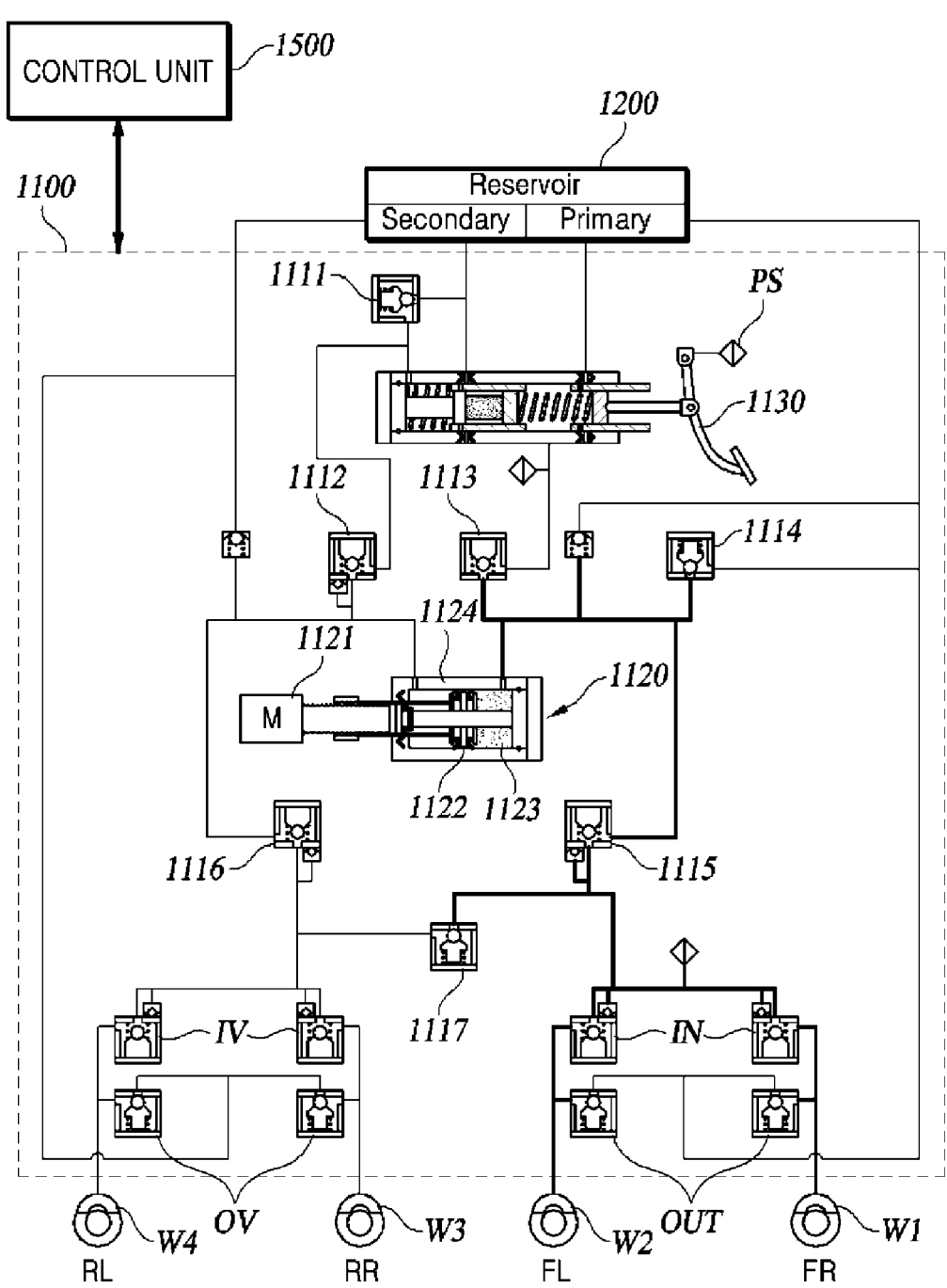
FIG. 8 is a hydraulic circuit diagram showing the state in which a third target valve group according to an embodiment of the present disclosure is closed in a process of removing contaminants from the third target valve group.

FIG. 8 is a hydraulic circuit diagram showing the state in which a third target valve group according to an embodiment of the present disclosure is closed in a process of removing contaminants from the third target valve group.

Figure 9:
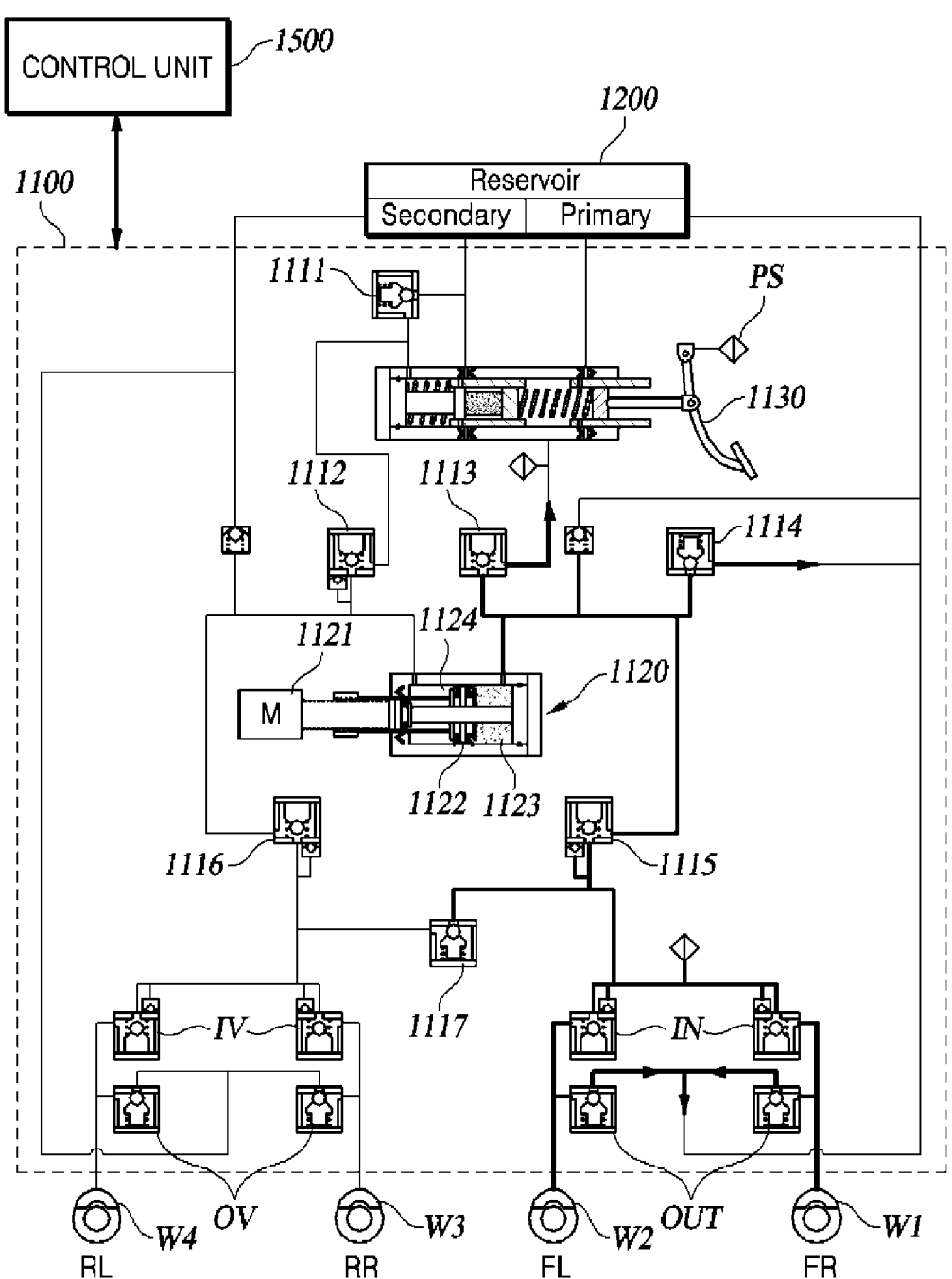
FIG. 9 is a hydraulic circuit diagram showing the state in which the third target valve group according to an embodiment of the present disclosure is open in the process of removing contaminants from the third target valve group.

FIG. 9 is a hydraulic circuit diagram showing the state in which the third target valve group according to an embodiment of the present disclosure is open in the process of removing contaminants from the third target valve group.

Referring to FIGS. 2 to 8, a contaminant removal process is performed on the third target valve group 1113, 1114, 1115, 1117, and OUT. The control unit 1500 controls the brake device 1100 such that the third target valve group 1113, 1114, 1115, 1117, and OUT is closed. Thereafter, the control unit 1500 controls the brake device 1100 such that the piston 1122 moves forward. Accordingly, the hydraulic pressure of the channels indicated by bold lines in FIG. 8 increases. That is, high hydraulic pressure is generated at a first side of each of the third target valves 1113, 1114, 1115, 1117, and OUT.

Referring to FIGS. 2 to 9, the control unit 1500 controls the brake device 1100 such that the third target valve group 1113, 1114, 1115, 1117, and OUT is opened with high hydraulic pressure generated at one side of each of the third target valves 1113, 1114, 1115, 1117, and OUT. High-pressure fluid is transmitted to the channel at the first side of each of the third target valves 1113, 1114, 1115, 1117, and OUT to the channel at a second side through the third target valves 1113, 1114, 1115, 1117, and OUT. Accordingly, contaminants in the third target valve group 1113, 1114, 1115, 1117, and OUT are separated out from the third target valve group 1113, 1114, 1115, 1117, and OUT by the high-pressure fluid. Contaminants in each of the third target valves 1113, 1114, 1115, 1117, and OUT can be collected to the oil reservoir 1120 through the channel at the second side of each of the third target valves 1113, 1114, 1115, 1117, and OUT.

Such a contaminant removal process for the third target valve group 1113, 1114, 1115, 1117, and OUT may include the process S2241 to S2244 of FIG. 2. In the contaminant removal process for the third target valve group 1113, 1114, 1115, 1117, and OUT, the control unit 1500 controls the pressurizer 1120 such that the piston 1122 moves forward (S2241). The control unit 1500 controls the brake device 1100 such that the third target valve group 1113, 1114, 1115, 1117, and OUT is closed (S2242). As the third target valve group 1113, 1114, 1115, 1117, and OUT is closed after the process S2242, the control unit 1500 controls the brake device 1100 to supply hydraulic pressure to at least one of separate channels (S2243). After the process S2243, the control unit 1500 controls the brake device 1100 such that the third target valve group 1113, 1114, 1115, 1117, and OUT is opened. Accordingly, the third target valve group 1113, 1114, 1115, 1117, and OUT is washed (S2244).

Figure 10:
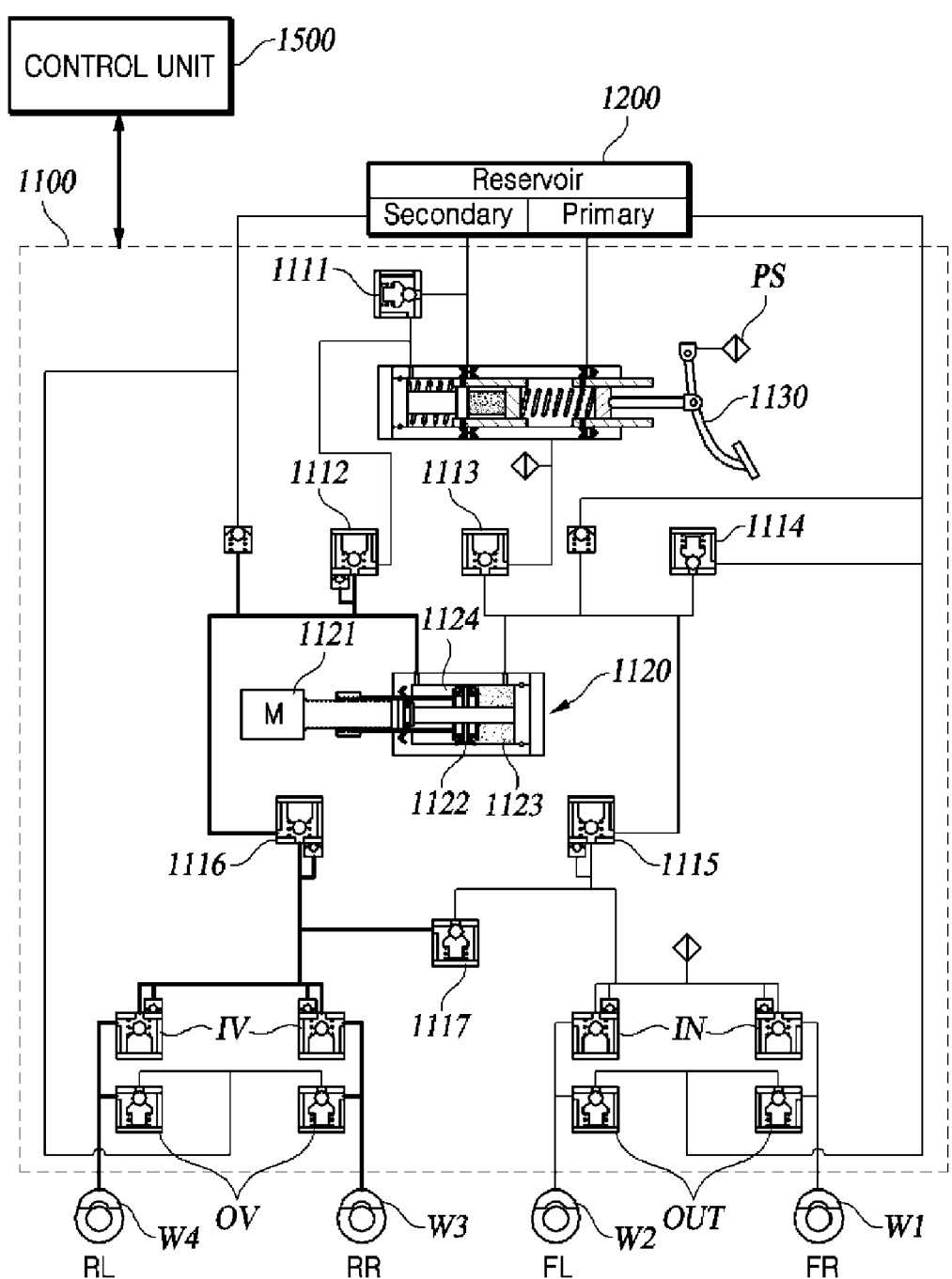
FIG. 10 is a hydraulic circuit diagram showing the state in which a fourth target valve group according to an embodiment of the present disclosure is closed in a process of removing contaminants from the fourth target valve group.

FIG. 10 is a hydraulic circuit diagram showing the state in which a fourth target valve group according to an embodiment of the present disclosure is closed in a process of removing contaminants from the fourth target valve group.

Figure 11:
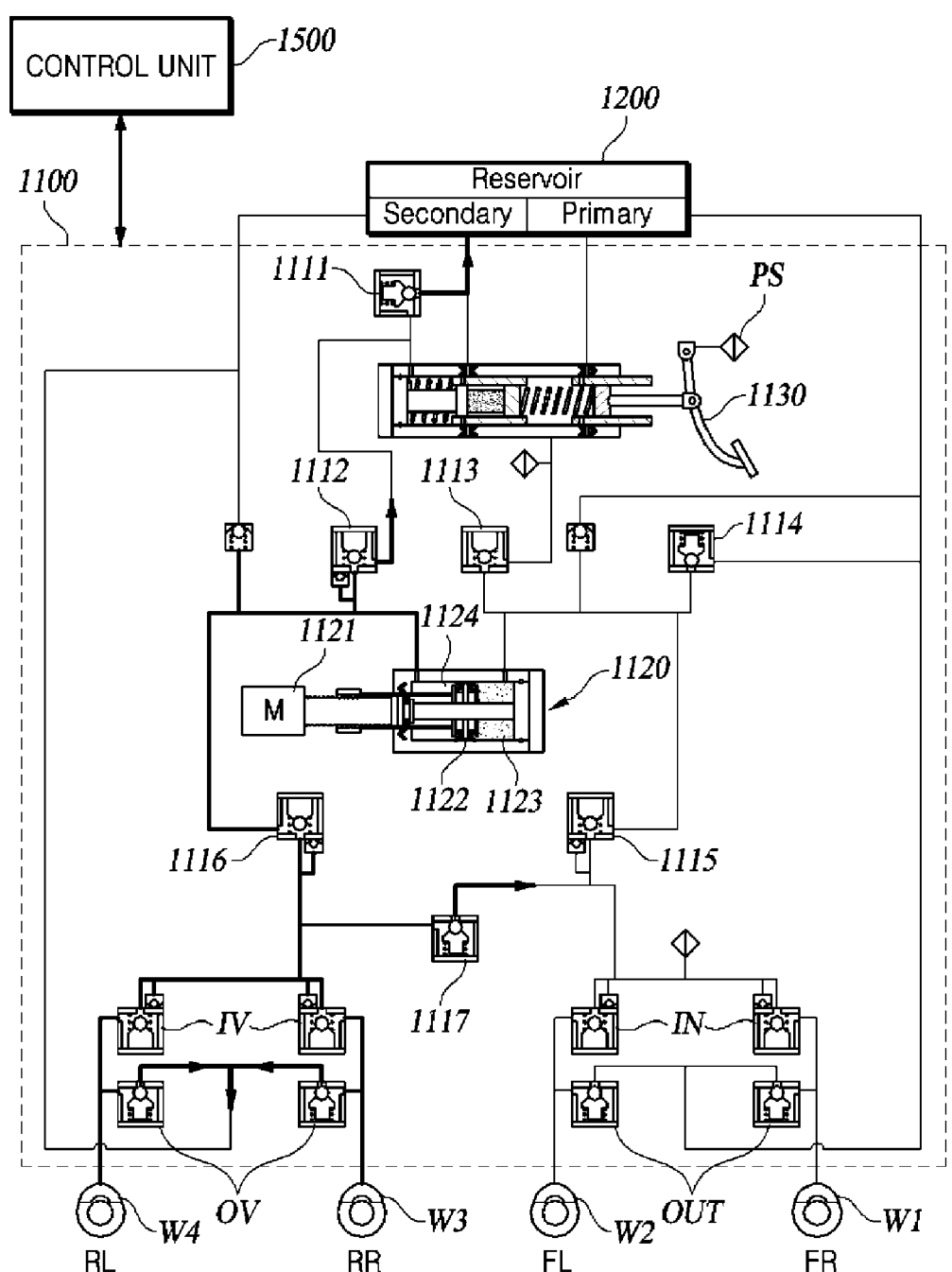
FIG. 11 is a hydraulic circuit diagram showing the state in which the fourth target valve group according to an embodiment of the present disclosure is open in the process of removing contaminants from the fourth target valve group.

FIG. 11 is a hydraulic circuit diagram showing the state in which the fourth target valve group according to an embodiment of the present disclosure is open in the process of removing contaminants from the fourth target valve group.

Referring to FIGS. 2 to 10, a contaminant removal process is performed on the fourth target valve group 1111, 1112, 1116, 1117, and OV. The control unit 1500 controls the brake device 1100 such that the fourth target valve group 1111, 1112, 1116, 1117, and OV is closed. Thereafter, the control unit 1500 controls the brake device 1100 such that the piston 1122 moves backward. Accordingly, the hydraulic pressure of the channels indicated by bold lines in FIG. 10 increases. That is, high hydraulic pressure is generated at a first side of each of the fourth target valves 1111, 1112, 1116, 1117, and OV.

Referring to FIGS. 2 to 11, the control unit 1500 controls the brake device 1100 such that the fourth target valve group 1111, 1112, 1116, 1117, and OV is opened with high hydraulic pressure generated at one side of each of the fourth target valves 1111, 1112, 1116, 1117, and OV. High-pressure fluid is transmitted to the channel at the first side of each of the fourth target valves 1111, 1112, 1116, 1117, and OV to the channel at a second side through the fourth target valves 1111, 1112, 1116, 1117, and OV. Accordingly, contaminants in the fourth target valve group 1111, 1112, 1116, 1117, and OV are separated out from the fourth target valve group 1111, 1112, 1116, 1117, and OV by the high-pressure fluid. Contaminants in each of the third fourth target valves 1111, 1112, 1116, 1117, and OV can be collected to the oil reservoir 1120 through the channel at the second side of each of the fourth target valves 1111, 1112, 1116, 1117, and OV.

Such a contaminant removal process for the fourth target valve group 1111, 1112, 1116, 1117, and OV may include the process S2251 to S2254 of FIG. 2. In the contaminant removal process for the third fourth target valve group 1111, 1112, 1116, 1117, and OV, the control unit 1500 controls the pressurizer 1120 such that the piston 1122 moves backward (S2251). The control unit 1500 controls the brake device 1100 such that the fourth target valve group 1111, 1112, 1116, 1117, and OV is closed (S2252). As the fourth target valve group 1111, 1112, 1116, 1117, and OV is closed after the process S2252, the control unit 1500 controls the brake device 1100 to supply hydraulic pressure to at least one of separate channels (S2253). After the process S2253, the control unit 1500 controls the brake device 1100 such that the fourth target valve group 1111, 1112, 1116, 1117, and OV is opened. Accordingly, the fourth target valve group 1111, 1112, 1116, 1117, and OV is washed (S2254).

In FIG. 2, the contaminant removal process S2221 to S2224 for the first target valve group 1113, 1114, OV, and OUT, the contaminant removal process S2231 to S2234 for the second target valve group 1111, 1112, OV, and OUT, the contaminant removal process S2241 to S2244 for the third target valve group 1113, 1114, 1115, 1117, and OUT, and the contaminant removal process S2251 to S2254 for the fourth target valve group 1111, 1112, 1116, 1117, and OV are sequentially performed, but the contaminant removal process of the present disclosure is not limited to this sequence. For example, the contaminant removal process S2221 to S2234 for the first and second target valve groups 1111, 1112, OV, and OUT may be performed after the contaminant removal process S2241 to S2254 for the third and fourth target valve groups 1111, 1112, 1116, 1117, and OV. The process S2221 to the process S2254 may be sequentially performed while the piston 1122 reciprocates two times.

Figure 12:
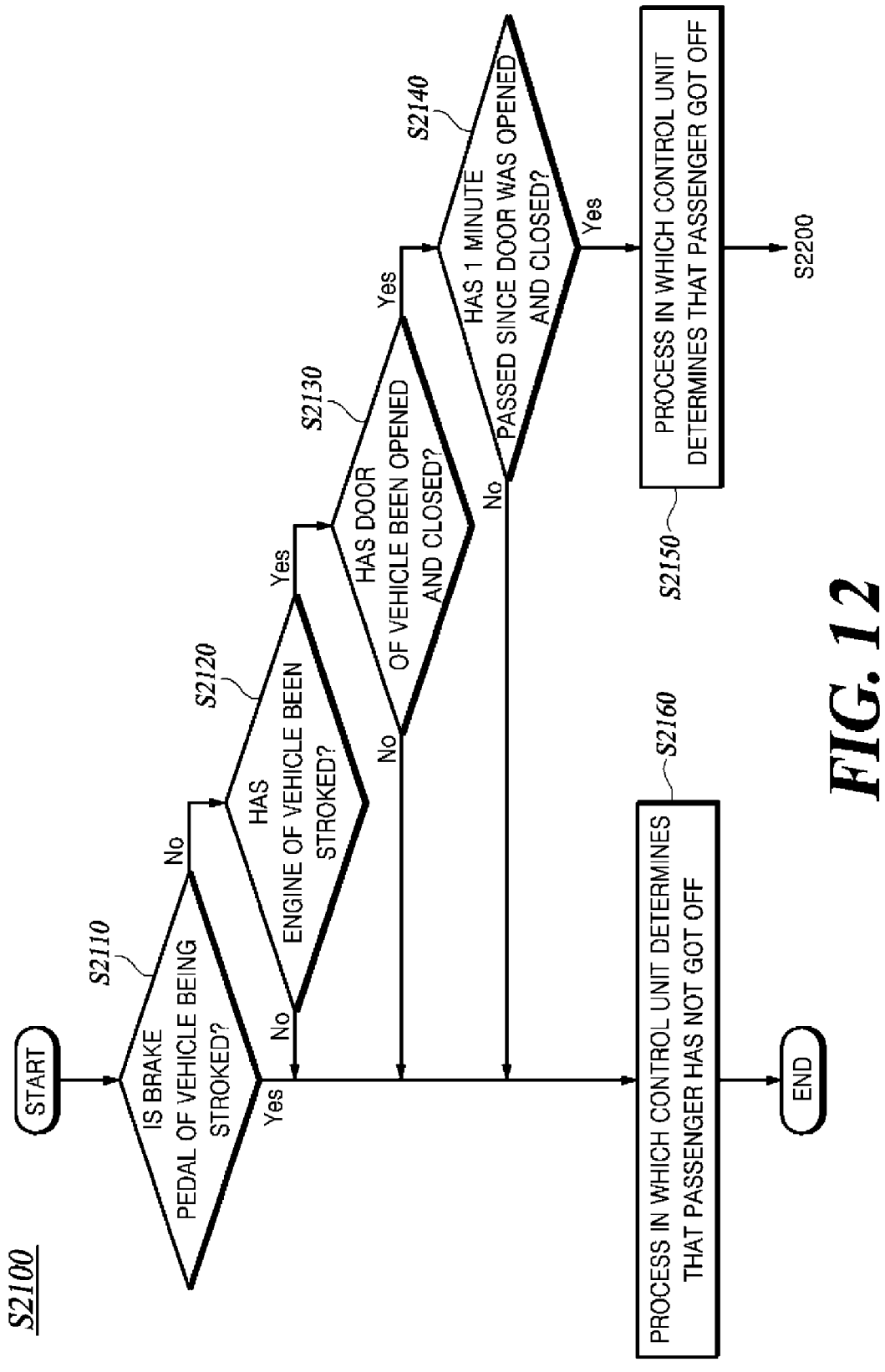
FIG. 12 is a flowchart showing a process of determining whether a passenger gets off according to an embodiment of the present disclosure.

FIG. 12 is a flowchart showing a process of determining whether a passenger gets off according to an embodiment of the present disclosure.

Referring to FIG. 12, when a passenger gets off a vehicle, a brake pedal 1130 is not stroked. The passenger stops the engine of the vehicle before or immediately after getting off the vehicle. Further, the passenger opens and closes a door of the vehicle when getting off the vehicle. In order for the control unit 1500 to determine whether a passenger has gotten off the vehicle in the process S2300, the control unit 1500 determines whether the brake pedal 1300 is being stroked (S2110). The control unit 1500 can determine whether the brake pedal 1300 is being stroked on the basis of a stroke signal generated by a pedal stroke sensor PS. The control unit 1500 determines whether the engine of the vehicle has been stopped (S2120). The control unit 1500 determines whether a door of the vehicle has been opened and then stopped (S2130). When determining that the brake pedal 1130 is not stroked, the engine of the vehicle is stopped, and a door of the vehicle has been opened and then closed, the control unit 1500 determines that a passenger has gotten off. Further, the control unit 1500 may further determine whether 1 minute has passed since the door was opened and then closed, and then determine that a passenger has gotten off when 1 minute has passed. If not, the control unit 1500 determines that a passenger is in the vehicle.

Figure 13:
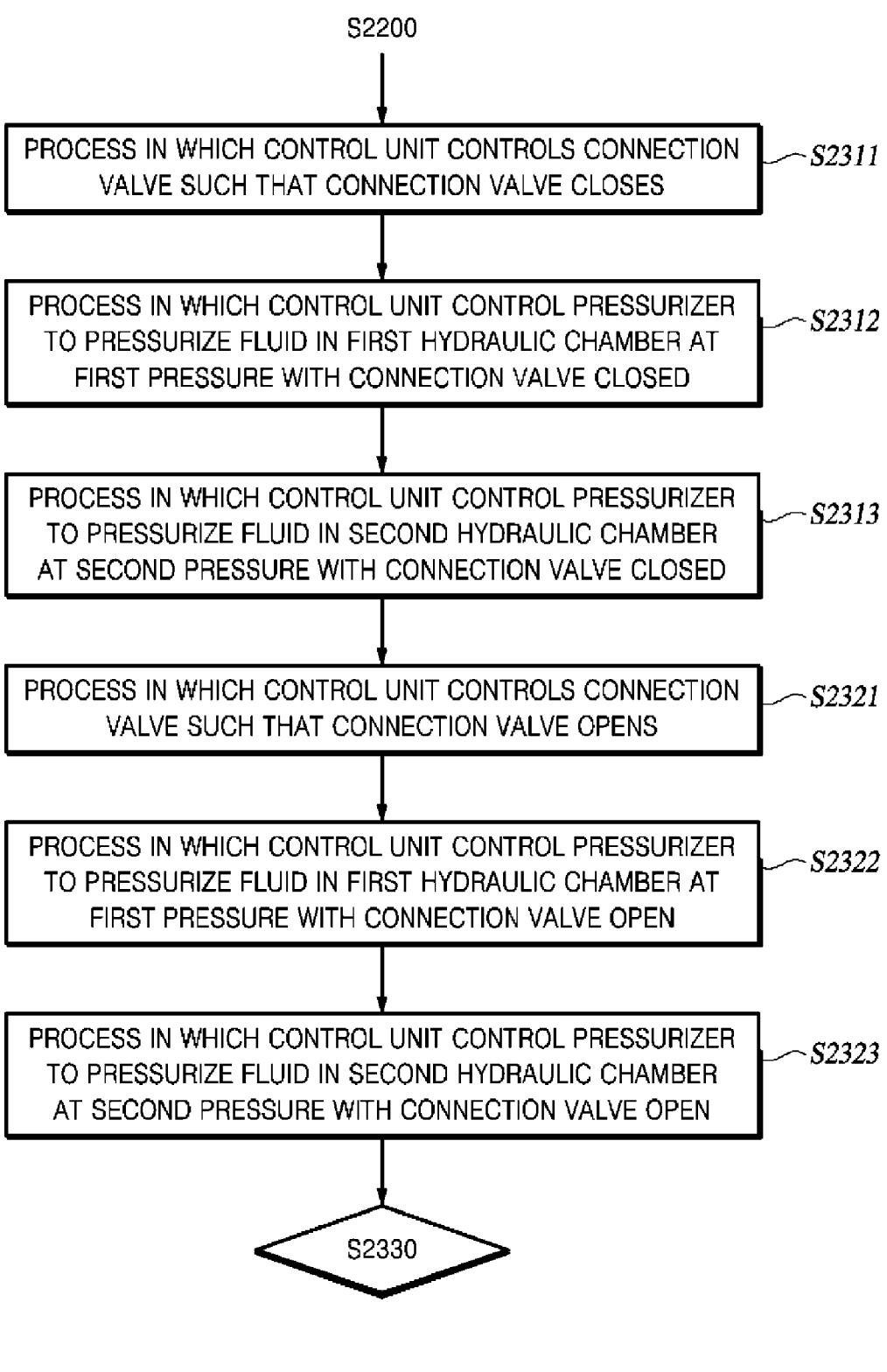
FIG. 13 is a flowchart showing a process of controlling a brake device of a self-test process according to an embodiment of the present disclosure.

FIG. 13 is a flowchart showing a process of controlling a brake device of a self-test process according to an embodiment of the present disclosure.

Figure 14:
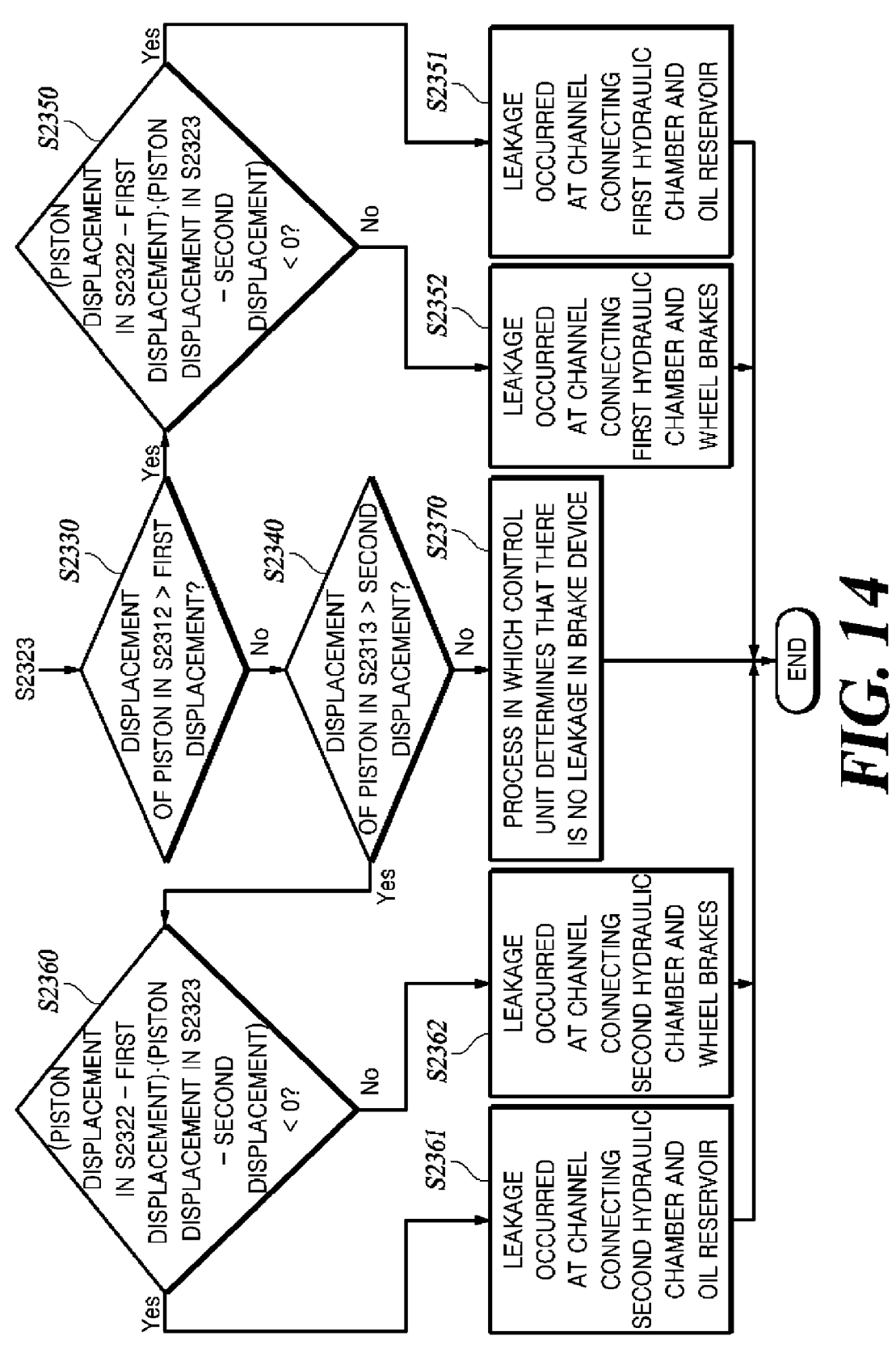
FIG. 14 is a flowchart showing a process of determining whether there is leakage and/or a leakage position of the self-test process according to an embodiment of the present disclosure.

FIG. 14 is a flowchart showing a process of determining whether there is leakage and/or a leakage position of the self-test process according to an embodiment of the present disclosure.

In the present disclosure, the fact that leakage occurred any channel means that fluid leaked on a path through which fluid can flow. When leakage occurs at a channel, for example, it includes leakage occurred at the valves 1111 to 1117, IV, IN, OV, and OUT or the pressurizer 1120.

Referring to FIGS. 13 and 14, in order for the control unit 1500 to determine whether there is leakage and/or a leakage position in the brake device 1100, the control unit 1500 pressurizes the pressurizer 1120 such that the piston 1122 pressurizes the fluid in the first hydraulic chamber 1123 at first pressure (hereafter, a 'first hydraulic chamber (1123 and

1124)-pressurizing process'). The control unit 1500 controls the pressurizer 1120 such the piston 1122 pressurizes the fluid in the second hydraulic chamber 1124 at second pressure (hereafter, a 'second hydraulic chamber (1123 and 1124)-pressurizing process'). The control unit 1500 determines whether there is leakage and/or a leakage position in the brake device 1100 on the basis of displacement of the piston 1122 in the first hydraulic chamber (1123 and 1124)-pressurizing process and/or the second hydraulic chamber (1123 and 1124)-pressurizing process.

When the piston 1122 supplies hydraulic pressure to a channel and the channel is damaged, fluid leaks through the damaged portion and the piston 1122 moves further than expected displacement (hereafter, 'expected displacement') calculated on the basis of the initial design specifications and a desired braking force of the brake device 1100. In this case, the desired braking force, which is a target braking force that is supposed to be applied to the vehicle by the hydraulic brake apparatus for a vehicle, may be calculated on the basis of a stroke signal generated by the pedal stroke sensor PS or a braking signal calculated by an autonomous driving system (not shown). When leakage occurs at the channel connected with the first hydraulic chamber 1123, the piston 1122 moves toward the first hydraulic chamber 1123 further than the expected displacement when the piston pressurizes the first hydraulic chamber 1123/Accordingly, when the piston 1122 moves further than first displacement in the first hydraulic chamber (1123 and 1124)-pressurizing process, the control unit 1500 can determine that leakage is occurring at the channel connected to the first hydraulic chamber 1123.

Similarly, when the piston 1124 moves further than second displacement in the second hydraulic chamber (1123 and 1124)-pressurizing process, the control unit 1500 can determine that leakage is occurring at the channel connected to the second hydraulic chamber 1124. In this case, the first displacement and the second displacement may be understood as expected displacement in the first hydraulic chamber (1123 and 1124)-pressurizing process and expected displacement in the second hydraulic chamber (1123 and 1124)-pressurizing process, respectively. Expected displacement according to a desired braking force may be stored in the form of a Look-Up Table (LUT) in a memory (not shown) of the control unit 1500.

In a self-test process S2300, the control unit 1500 may control the connection valve 1117 such that the connection valve 1117 closes (S2311), and may control the first hydraulic chamber (1123 and 1124)-pressurizing process (S2312) the second hydraulic chamber (1123 and 1124)-pressurizing process (S2313) with the connection valve 1117 closed. When the connection valve 1117 is closed, the channel connecting the first hydraulic chamber 1123 and the front wheel brakes w1 and w2 and the channel connecting the second hydraulic chamber 1124 and the rear wheel brakes w3 and w4 are fluid-disconnected from each other. In this state, when the piston 1122 pressurizes the first hydraulic chamber 1123, hydraulic pressure is supplied to the channel connecting the first hydraulic chamber 1123 and the front wheel brakes w1 and w2 and the channel connecting the first hydraulic chamber 1123 and the oil reservoir 1200. Accordingly, when the first hydraulic chamber 1123 is pressurized with the connection valve 1117 closed and the piston 1122 moves further than the first displacement, the control unit 1500 can determine that leakage occurred at the channel connecting the first hydraulic chamber 1123 and the front wheel brakes w1 and w2 and the channel connecting the first hydraulic chamber 1123 and the oil reservoir 1200. Similarly, when the second hydraulic chamber 1124 is pressurized and the piston 1122 moves further than the second displacement, the control unit 1500 can determine that leakage occurred at the channel connecting the second hydraulic chamber 1124 and the rear wheel brakes w3 and w4 and the channel connecting the second hydraulic chamber 1124 and the oil reservoir 1200.

It is unlikely that in a self-test process S2300, the control unit 1500 may control the connection valve 1117 such that the connection valve 1117 opens (S2321), and may control the first hydraulic chamber (1123 and 1124)-pressurizing process (S2322) and the second hydraulic chamber (1123 and 1124)-pressurizing process (S2323) with the connection valve 1117 open. When the connection valve 1117 is opened, the channel connecting the first hydraulic chamber 1123 and the front wheel brakes w1 and w2 and the channel connecting the second hydraulic chamber 1124 and the rear wheel brakes w3 and w4 fluid-communicate with each other. In this state, when the piston 1122 pressurizes the first hydraulic chamber 1123, hydraulic pressure is supplied to the hydraulic circuit connecting the first hydraulic chamber 1123 and the front wheel and rear wheel brakes w1, w2, w3, and w4 and the hydraulic circuit connecting the first hydraulic chamber 1123 and the oil reservoir 1200. Accordingly, when the first hydraulic chamber 1123 is pressurized with the connection valve 1117 open and the piston 1122 moves further than the first displacement, the control unit 1500 can determine that leakage occurred at the channel connecting the first hydraulic chamber 1123 and the front wheel and rear wheel brakes w1, w2, w3, and w4 and the channel connecting the first hydraulic chamber 1123 and the oil reservoir 1200. Similarly, when the second hydraulic chamber 1124 is pressurized and the piston 1122 moves further than the second displacement, the control unit 1500 can determine that leakage occurred at the channel connecting the second hydraulic chamber 1124 and the front wheel and rear wheel brakes w1, w2, w3, and w4 and the channel connecting the second hydraulic chamber 1124 and the oil reservoir 1200.

[Case 1]

Hereafter, a case in which it is possible to determine that leakage occurred at the channel connecting the first hydraulic chamber 1123 and the oil reservoir 1200 is described. Referring to FIG. 14, when the piston 1122 pressurizes the first hydraulic chamber 1123 with the connection valve 1117 closed, the piston 1122 moves further than the first displacement. When the piston 1122 pressurizes the first hydraulic chamber 1123 with the connection valve 1117 open, the piston 1122 moves further than the first displacement. When the piston 1122 pressurizes the second hydraulic chamber 1124 with the connection valve 1124 open, the piston 1122 moves by the second displacement. If the displacement of the piston 1122 in the series of processes of controlling the connection valve 1117 and the pressurizer 1120 is the same as those described above, the control unit 1500 can determine that leakage occurred at the channel connecting the first hydraulic chamber 1123 and the oil reservoir 1200 (S2330, S2350, and S2351).

[Case 2]

Hereafter, a case in which it is possible to determine that leakage occurred at the channel connecting the first hydraulic chamber 1123 and the front wheel brakes w1 and w2 is described. When the piston 1122 pressurizes the first hydraulic chamber 1123 with the connection valve 1117 closed, the piston 1122 moves further than the first displacement. When the piston 1122 pressurizes the first hydraulic chamber 1123 with the connection valve 1117 open, the piston 1122 moves further than the first displacement. When the piston 1122 pressurizes the second hydraulic chamber 1124 with the connection valve 1124 open, the piston 1122 moves further than the second displacement. If the displacement of the piston 1122 in the series of processes of controlling the connection valve 1117 and the pressurizer 1120 is the same as those described above, the control unit 1500 can determine that leakage occurred at the channel connecting the first hydraulic chamber 1123 and the front wheel brakes w1 and w2 (S2330, S2350, and S2352).

[Case 3]

Hereafter, a case in which it is possible to determine that leakage occurred at the channel connecting the second hydraulic chamber 1124 and the oil reservoir 1200 is described. When the piston 1122 pressurizes the second hydraulic chamber 1124 with the connection valve 1124 closed, the piston 1122 moves further than the second displacement. When the piston 1122 pressurizes the second hydraulic chamber 1124 with the connection valve 1124 open, the piston 1122 moves further than the second displacement. When the piston 1122 pressurizes the first hydraulic chamber 1123 with the connection valve 1123 open, the piston 1122 moves by the first displacement. If the displacement of the piston 1122 in the series of processes of controlling the connection valve 1117 and the pressurizer 1120 is the same as those described above, the control unit 1500 can determine that leakage occurred at the channel connecting the second hydraulic chamber 1124 and the oil reservoir 1200 (S2330, S2340, S2360, and S2361).

[Case 4]

Hereafter, a case in which it is possible to determine that leakage occurred at the channel connecting the second hydraulic chamber 1124 and the rear wheel brakes w3 and w4 is described. When the piston 1122 pressurizes the second hydraulic chamber 1124 with the connection valve 1124 closed, the piston 1122 moves further than the second displacement. When the piston 1122 pressurizes the second hydraulic chamber 1124 with the connection valve 1124 open, the piston 1122 moves further than the second displacement. When the piston 1122 pressurizes the first hydraulic chamber 1123 with the connection valve 1117 open, the piston 1122 moves further than the first displacement. If the displacement of the piston 1122 in the series of processes of controlling the connection valve 1117 and the pressurizer 1120 is the same as those described above, the control unit 1500 can determine that leakage occurred at the channel connecting the second hydraulic chamber 1124 and the rear wheel brakes w3 and w4 (S2330, S2340, S2360, and S2362).

[Case 5]

With the connection valve 1117 closed, when the piston 1122 pressurizes the first hydraulic chamber 1123 and does not move further than the first displacement and when the piston 1122 pressurizes the second hydraulic chamber 1124 and does not move further than the second displacement, the control unit 1500 determines that there is no leakage in the brake device 1100 (S2330, S2340, and S2370).

The control unit 1500 can determine whether there is leakage by performing the first hydraulic chamber (1123 and 1124)-pressurizing process and the second hydraulic chamber (1123 and 1124)-pressurizing process with the connection valve 1117 closed. Thereafter, the control unit 1500 can determine a leakage position by performing the first hydraulic chamber (1123 and 1124)-pressurizing process and the second hydraulic chamber (1123 and 1124)-pressurizing process with the connection valve 1117 open.

If the displacement of the piston 1122 is the first displacement or more in the first hydraulic chamber (1123 and 1124)-pressurizing process performed with the connection valve 1117 open and the displacement of the piston 1122 is less than the second displacement in the second hydraulic chamber (1123 and 1124)-pressurizing process, the control unit 1500 determines that leakage occurred at the channel connecting the first hydraulic chamber 1123 and the oil reservoir 1200 (Case 1).

If the displacement of the piston 1122 is less than the first displacement in the first hydraulic chamber (1123 and 1124)-pressurizing process performed with the connection valve 1117 open and the displacement of the piston 1122 is the second displacement or more in the second hydraulic chamber (1123 and 1124)-pressurizing process, the control unit 1500 determines that leakage occurred at the channel connecting the second hydraulic chamber 1124 and the oil reservoir 1200 (Case 3).

Referring to FIG. 13, the control unit 1500 sequentially performs the first hydraulic chamber (1123 and 1124)-pressurizing process (S1123 and S1124) and the second hydraulic chamber (1123 and 1124)-pressurizing process (S2311 to S2313) with the connection valve 1117 closed, and then the first hydraulic chamber (1123 and 1124)-pressurizing process (S1123 and S1124) and the second hydraulic chamber (1123 and 1124)-pressurizing process (S2311 to S2313) with the connection valve 1117 open, but the control method of the present disclosure is not limited thereto. For example, the processes S2311 to S2313 may be performed after the processes S2321 to S2323, or the second hydraulic chamber (1123 and 1124)-pressurizing process may be performed before the first hydraulic chamber (1123 and 1124)-pressurizing process.

Referring to FIGS. 13 and 14, the process of determining whether there is leakage and/or a leakage position (S2323 to S2351) of FIG. 14 is performed after the process of controlling the connection valve 1117 and the pressurizer 1120 (S2311 to S2323) of FIG. 13, but the sequence is not limited to the sequence shown in the figures. For example, the processes S2312, S2330, S2313, and S2340 may be sequentially performed.

Figure 15:
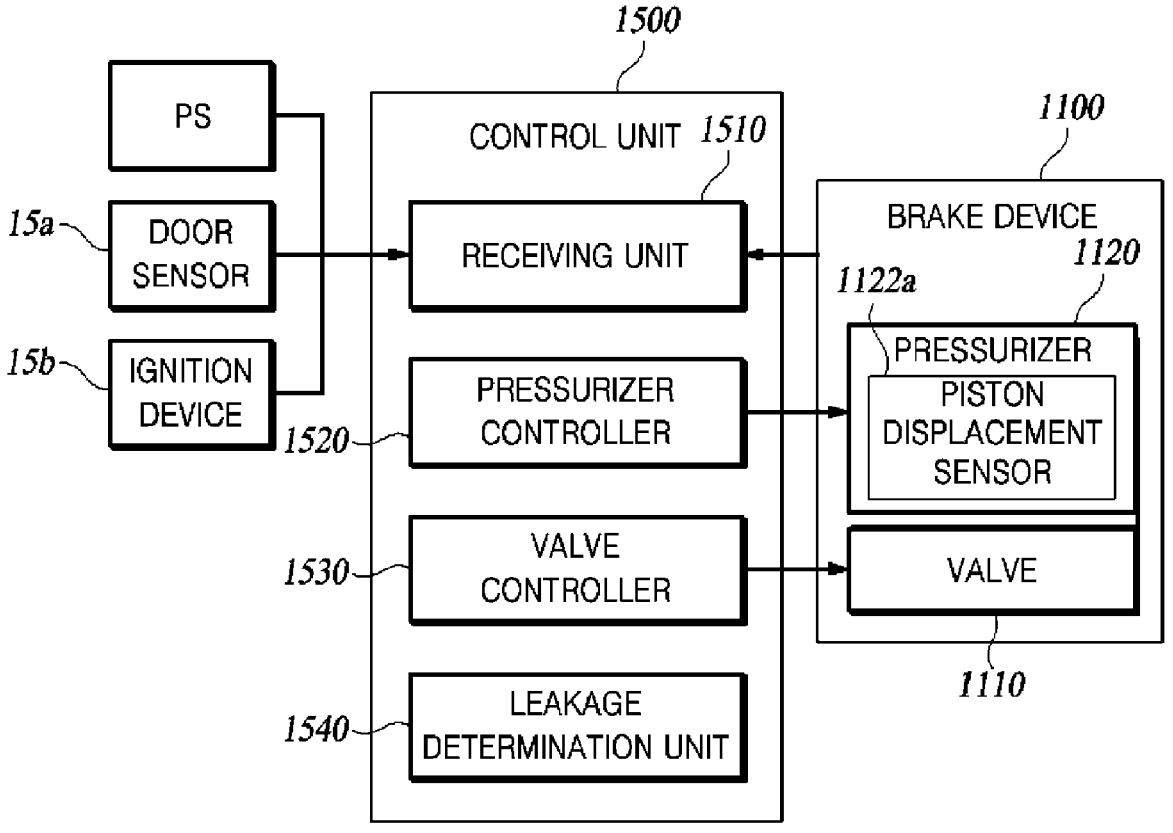
FIG. 15 is a block diagram showing the configuration of a hydraulic brake apparatus for a vehicle according to an embodiment of the present disclosure.

FIG. 15 is a block diagram showing the configuration of a hydraulic brake apparatus for a vehicle according to an embodiment of the present disclosure.

The control method described above may be performed by a hydraulic brake apparatus for a vehicle according to an embodiment of the present disclosure. An embodiment of a hydraulic brake apparatus for a vehicle to be described hereafter may include the configuration of the hydraulic brake apparatus for a vehicle of the control method described above. The configuration and function of the hydraulic brake apparatus for a vehicle to be described hereafter correspond to the configuration and function of the hydraulic brake apparatus for a vehicle of the control method described above, so repeated description is omitted.

The control unit 1500 may include some or all of a receiving unit 1510, a pressurizer controller 1520, a valve controller 1530, and a leakage determination unit 1540. The receiving unit 1510 receives a brake pedal stroke, information about whether a door is opened/close, information for determining whether the engine of a vehicle is stopped, and information about displacement of the piston 1122. The brake pedal stroke may be measured by the pedal stroke sensor PS and transmitted to the receiving unit 1510 in the form of an electrical signal. A door sensor 15a mounted on a door of a vehicle can transmit information about whether a door is opened/close to the receiving unit. An ignition device 15b can transmit whether the engine of a vehicle is started to the receiving unit 1510. A piston displacement sensor 1122a can transmit information about displacement of the piston 1122 to the receiving unit 1510.

The valve controller 1530 can adjust the opening/closing state of a target valve group by controlling a current value that is applied to a target valve that is a solenoid valve. The valve controller 1530 controls a target valve group such that the target valve group is closed in order to wash the target valve group. The pressurizer controller 1520 can change the magnitude of hydraulic pressure generated by the pressurizer 1120 or the channel through which hydraulic pressure is transmitted, by adjusting the intensity or the phase of a current that is applied to the motor 1121 that drives the pressurizer 1120. The pressurizer controller 1120 control the pressurizer 1120 with a target valve group closed such that hydraulic pressure is supplied to at least one of channels separated by closing the target valve group. When hydraulic pressure is supplied to at least one of the channels separated by closing the target valve group by the pressurizer 1120, the valve controller 1130 controls the target valve group such that the target valve group opens.

The leakage determination unit 1540 is configured to determine whether there is leakage and/or a leakage position in the brake device 1100. The pressurizer controller 1520 can control the pressurizer 1120 such that the pressurizer 1120 pressurizes fluid at a preset magnitude. The leakage determination unit 1540 can determine whether there is leakage and/or a leakage position using the displacement of the piston 1122 in the pressurizer 1120 when fluid is pressurized by pressure having a preset magnitude. For example, the pressurizer controller 1120 can control the pressurizer such that the piston 1122 pressurizes the fluid in the first hydraulic chamber 1123 at first pressure or the piston pressurizes the fluid in the second hydraulic chamber 1124 at second pressure. The leakage determination unit 1540 can determine whether there is leakage and/or a leakage position in the brake device 1100 using the displacement of the piston when the first hydraulic chamber 1123 is pressurized at first pressure and the displacement of the piston 1122 when the second hydraulic chamber 1124 is pressurized at second pressure.

When the piston supplies hydraulic pressure to a channel and the channel is damaged, fluid leaks through the damaged portion, and the piston 1122 moves further than expected displacement. When leakage occurs at the channel connected with the first hydraulic chamber 1123, the piston 1122 moves toward the first hydraulic chamber 1123 further than the expected displacement when the piston pressurizes the first hydraulic chamber 1123/Accordingly, when the piston 1122 moves further than first displacement in the first hydraulic chamber (1123 and 1124)-pressurizing process, the control unit 1500 can determine that leakage is occurring at the channel connected to the first hydraulic chamber 1123. Similarly, when the piston 1124 moves further than second displacement in the second hydraulic chamber (1123 and 1124)-pressurizing process, the control unit 1500 can determine that leakage is occurring at the channel connected to the second hydraulic chamber 1124. In this case, the first displacement and the second displacement may be understood as expected displacement in the first hydraulic chamber (1123 and 1124)-pressurizing process and expected displacement in the second hydraulic chamber (1123 and 1124)-pressurizing process, respectively. Expected displacement according to a desired braking force may be stored in the form of a Look-Up Table (LUT) in a memory (not shown) of the control unit 1500.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling a brake device for a vehicle, the brake device including (1) a plurality of valves configured to selectively transmit a hydraulic pressure to a plurality of wheel brakes and (2) a pressurizer configured to pressurize a fluid, the method comprising:

performing a process of removing contaminant from the brake device, the process of removing the contaminant including:

closing a target valve group including one or more selected valves of the plurality of valves;

supplying a hydraulic pressure to at least one of a plurality of channels closed by closing of the target valve group; and opening the target valve group and causing the fluid to wash the target valve group, wherein the brake device includes a connection valve configured to establish or discontinue a fluid connection between at least some of the plurality of wheel brakes and the other of the plurality of wheel brakes, wherein the pressurizer includes a piston and a plurality of hydraulic chambers including a first hydraulic chamber positioned in front of the piston and a second hydraulic chamber positioned behind the piston, and the method of controlling the brake device further comprising:

determining at least one of a leakage occurrence and a leakage position in the brake device, wherein the at least one of leakage occurrence and leakage position is determined based on piston displacements respectively measured during pressurization of the first hydraulic chamber and the second hydraulic chamber, in both open and closed states of the connection valve.

2. The method of claim 1, wherein the process is of removing the contaminant from the brake device performed for a plurality of target valve groups, each target valve group including a different combination of the plurality of valves, wherein the plurality of target valve groups includes a first target valve group, a second target valve group, a third target valve group and a fourth target valve group.

3. The method of claim 2, wherein:

the first target valve group includes at least one of the plurality of valves disposed at a channel connecting the first hydraulic chamber and an oil reservoir, and the process of removing the contaminant from the brake device is performed on the first target valve group when the piston moves in a forward direction to pressurize the first hydraulic chamber.

4. The method of claim 2, wherein:

the second target valve group includes at least one of the plurality of valves disposed at a channel connecting the second hydraulic chamber and an oil reservoir, and the process of removing the contaminant from the brake device is performed on the second target valve group when the piston moves in a backward direction to pressurize the second hydraulic chamber.

5. The method of claim 2, wherein:

the third target valve group includes at least one of the plurality of valves disposed at the channel connecting the first hydraulic chamber and the wheel brakes, and the process of removing the contaminant from the brake device is performed on the third target valve group when the piston moves in a forward direction to pressurize the first hydraulic chamber.

6. The method of claim 2, wherein:

the fourth target valve group includes at least one of the plurality of valves disposed at the channel connecting the second hydraulic chamber and the wheel brakes, and the process of removing the contaminant from the brake device is performed on the fourth target valve group when the piston moves in a backward direction to pressurize the second hydraulic chamber.

7. The method of claim 1, further comprising determining whether a passenger is in the vehicle, wherein the process of removing the contaminant from the brake device is performed after determining that the passenger is not in the vehicle.

8. The method of claim 7, wherein determining whether the passenger is in the vehicle comprises:

determining whether a brake pedal of the vehicle is being depressed;

determining whether an engine of the vehicle has been stopped;

determining whether a door of the vehicle has been opened and then closed; and determining that the passenger is not in the vehicle in response to determining that the brake pedal of the vehicle is not depressed, the engine has been stopped, and the door of the vehicle has been opened and then closed.

9. The method of claim 1, wherein:

determining at least one of the leakage occurrence and leakage position in the brake device includes:

causing the piston to pressurize the fluid in the first hydraulic chamber at a first pressure; and causing the piston to pressurize the fluid in the second hydraulic chamber positioned behind the piston at a second pressure.

10. The method of claim 9, wherein:

determining at least one of the leakage occurrence and leakage position further includes closing the connection valve, and wherein causing the piston to pressurize the fluid in the first hydraulic chamber at the first pressure and causing the piston to pressurize the fluid in the second hydraulic chamber at the second pressure are performed with the connection valve closed.

11. The method of claim 10, wherein:

determining at least one of the leakage occurrence and leakage position in the brake device further includes opening the connection valve, and wherein causing the piston to pressurize the fluid in the first hydraulic chamber and causing the piston to pressurize the fluid in the second hydraulic chamber are performed with the connection valve open.

12. The method of claim 11, wherein:

the plurality of channels includes (1) a first channel connecting the first hydraulic chamber and an oil reservoir and (2) a second channel connecting the first hydraulic chamber and the wheel brakes, and determining at least one of the leakage occurrence and leakage position in the brake device includes determining that the leakage occurred to at least one of the first channel and the second channel when the displacement of the piston is equal to or greater than a first predefined displacement by causing the piston to pressurize the fluid in the first hydraulic chamber at the first pressure.

13. The method of claim 12, wherein:

the plurality of channels includes (1) a third channel connecting the second hydraulic chamber and an oil reservoir and (2) a fourth channel connecting the second hydraulic chamber and the wheel brakes, and determining at least one of the leakage occurrence and leakage position in the brake device includes determining that leakage occurred to at least one of the third channel and the second fourth channel when the displacement of the piston is equal to or greater than a second predefined displacement by causing the piston to pressurize the fluid in the second hydraulic chamber at the second pressure.

14. The method of claim 13, wherein:

determining at least one of the leakage occurrence and leakage position in the brake device includes determining that a leakage has occurred at a channel connecting the pressurizer and the wheel brakes when (1) it is determined that there is the leakage as a result of causing the piston to pressurize the fluid in the first hydraulic chamber at the first pressure and causing the piston to pressurize the fluid in the second hydraulic chamber at the second pressure with the connection valve closed, and (2) with the connection valve open, the displacement of the piston is equal to or greater than the first predefined displacement and is equal to or greater than the second predefined displacement.

15. The method of claim 13, wherein:

when it is determined that there is leakage as a result of causing the piston to pressurize the fluid in the first hydraulic chamber at the first pressure and causing the piston to pressurize the fluid in the second hydraulic chamber at the second pressure with the connection valve closed, determining the leakage position in the brake device includes:

determining that the leakage occurred at the first channel when, with the connection valve open, the displacement of the piston is (1) equal to or greater than the first predefined displacement while the first hydraulic chamber is pressurized and (2) is less than the second predefined displacement while the second hydraulic chamber is pressurized; and determining that the leakage occurred at the third channel connecting the second hydraulic chamber and the oil reservoir when, with the connection valve open, the displacement of the piston is (1) less than first predefined displacement while the first hydraulic chamber is pressurized and (2) is equal to or greater than the second predefined displacement while the second hydraulic chamber is pressurized.

16. A brake device for a vehicle, comprising:

a plurality of valves configured to selectively transmit a hydraulic pressure to a plurality of wheel brakes;

a pressurizer for pressurizing a fluid; and a control unit configured to:

close a target valve group including one or more selected valves of the plurality of valves;

supply a hydraulic pressure to at least one of a plurality of channels closed by closing of the target valve group; and open the target valve group and cause the fluid to wash the target valve group, wherein the brake device includes a connection valve configured to establish or discontinue a fluid connection with at least some of the plurality of wheel brakes and the other of the plurality of wheel brakes, wherein the pressurizer includes a piston and a plurality of hydraulic chambers including a first hydraulic chamber positioned in front of the piston and a second hydraulic chamber positioned behind the piston, wherein the control unit is further configured to:

determine a leakage occurrence and leakage position in the brake device; and control the pressurizer pressurizes the fluid at a predetermined pressure; and control the piston to pressurize the fluid in the first hydraulic chamber at a first pressure or to pressurize the fluid in the second hydraulic chamber at a second pressure, and determine at least one of the leakage occurrence and leakage position in the brake device based on a first displacement of the piston when the first hydraulic chamber is pressurized at the first pressure and a second displacement of the piston when the second hydraulic chamber is pressurized at the second pressure, wherein the first displacement of the piston and the second displacement of the piston are measured in both open and closed states of the connection valve.

* * * * *